(12) United States Patent
Bahl et al.

(10) Patent No.: US 10,690,856 B2
(45) Date of Patent: Jun. 23, 2020

(54) SYSTEM AND METHOD FOR BREAKING TIME-REVERSAL SYMMETRY WITH ACOUSTIC PUMPING OF NANOPHOTONIC CIRCUITS

(71) Applicant: The Board of Trustees of the University of Illinois, Urbana, IL (US)

(72) Inventors: Gaurav Bahl, Champaign, IL (US); Donggyu Benjamin Sohn, Urbana, IL (US)

(73) Assignee: THE BOARD OF TRUSTEES OF THE UNIVERSITY OF ILLINOIS, Urbana, IL (US)

(*) Notice: Subject to any disclaimer, the term of this patent is extended or adjusted under 35 U.S.C. 154(b) by 0 days.

(21) Appl. No.: 16/259,775

(22) Filed: Jan. 28, 2019

(65) Prior Publication Data

US 2019/0235169 A1  Aug. 1, 2019

Related U.S. Application Data

(60) Provisional application No. 62/624,151, filed on Jan. 31, 2018.

(51) Int. Cl.
G02B 6/27 (2006.01)
H01S 3/30 (2006.01)
G02F 1/01 (2006.01)
G02F 1/125 (2006.01)

(52) U.S. Cl.
CPC .......... *G02B 6/2746* (2013.01); *G02F 1/011* (2013.01); *G02F 1/0126* (2013.01); *G02F 1/0134* (2013.01); *G02F 1/125* (2013.01); *H01S 3/30* (2013.01)

(58) Field of Classification Search
CPC ............................. G02B 6/2746; G02F 1/125
See application file for complete search history.

(56) References Cited

U.S. PATENT DOCUMENTS

| 2002/0196532 | A1* | 12/2002 | Hashimoto | H01S 3/083 359/346 |
| 2014/0140651 | A1 | 5/2014 | Hafezi et al. | |
| 2016/0109736 | A1 | 4/2016 | Bahl et al. | |
| 2016/0209594 | A1 | 7/2016 | Bahl | |

OTHER PUBLICATIONS

H. Shin, et al., "Tailorable stimulated Brillouin scattering in nanoscale silicon waveguides," Nature Communications, 4:1944, 2013 (10 pages).

Tadesse, S.A. et al., "Sub-optical wavelength acoustic wave modulation of integrated photonic resonators at microwave frequencies," Nature Communications, 5:5402, 2014 (7 pages).

* cited by examiner

*Primary Examiner* — Omar R Rojas
(74) *Attorney, Agent, or Firm* — Benesch, Friedlander, Coplan & Aronoff LLP

(57) ABSTRACT

Systems and methods provide a nonreciprocal nanophotonic modulator. In some examples, the modulator utilizes acoustic pumping, instead of optical pumping with lasers, and is capable of achieving GHz bandwidth.

22 Claims, 14 Drawing Sheets

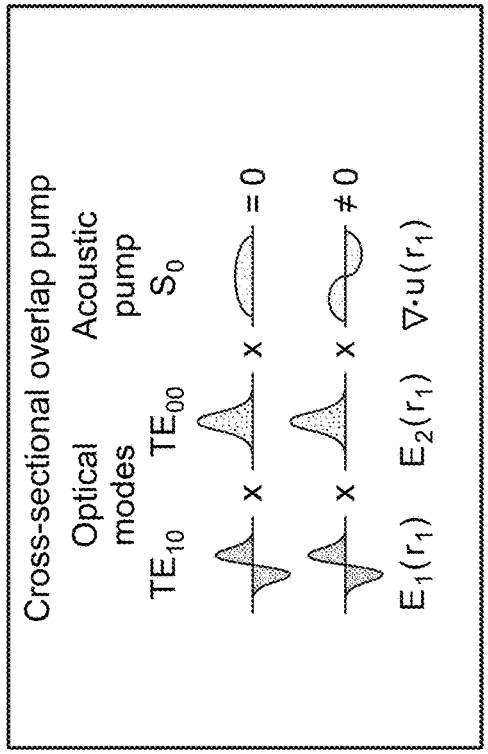
FIG. 1A
FIG. 1B
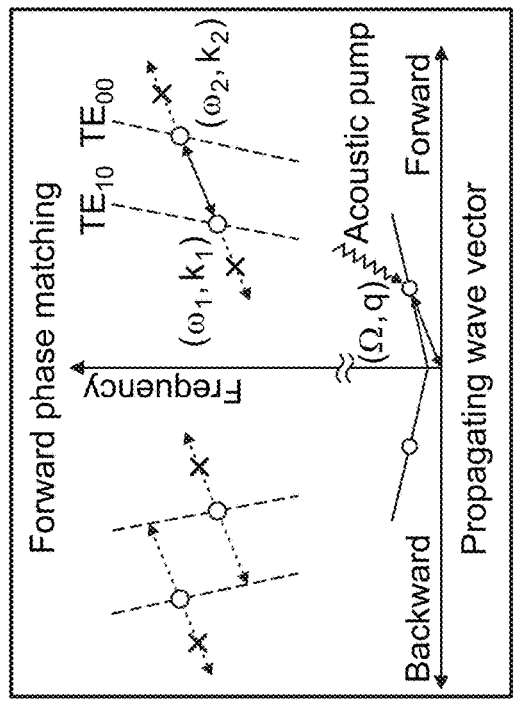
FIG. 1C
FIG. 1D

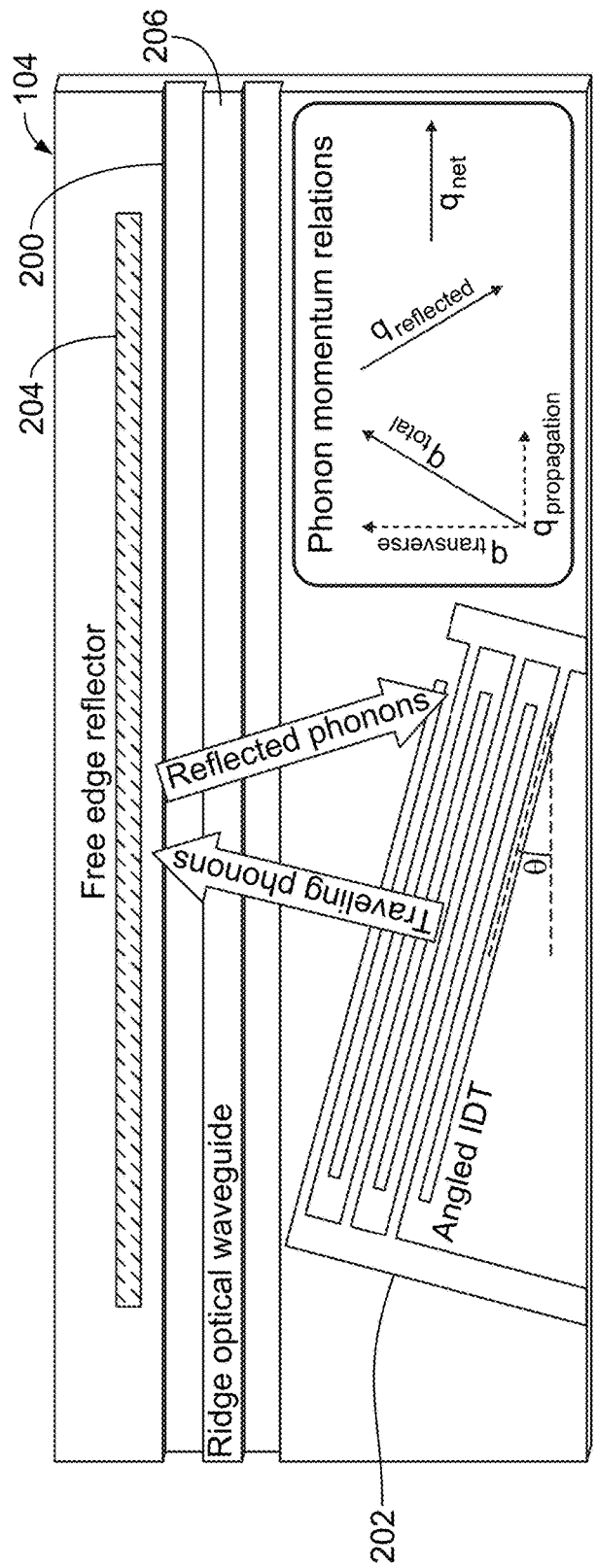
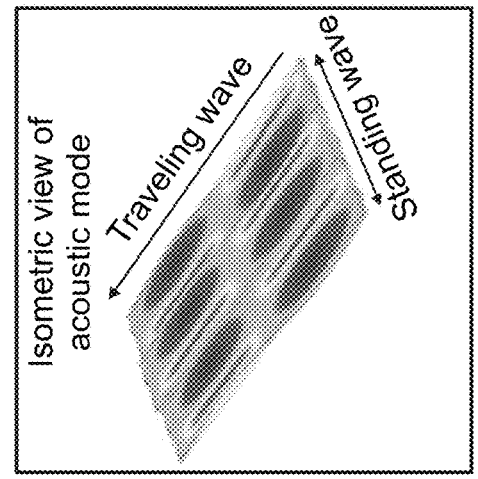
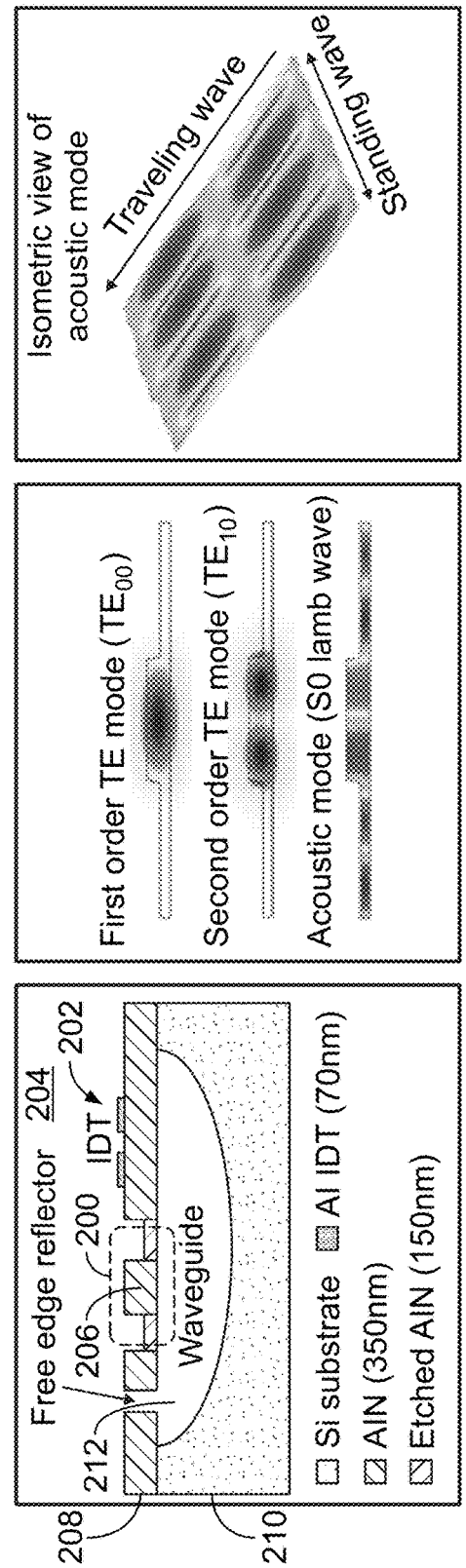
FIG. 2A
FIG. 2B
FIG. 2C
FIG. 2D

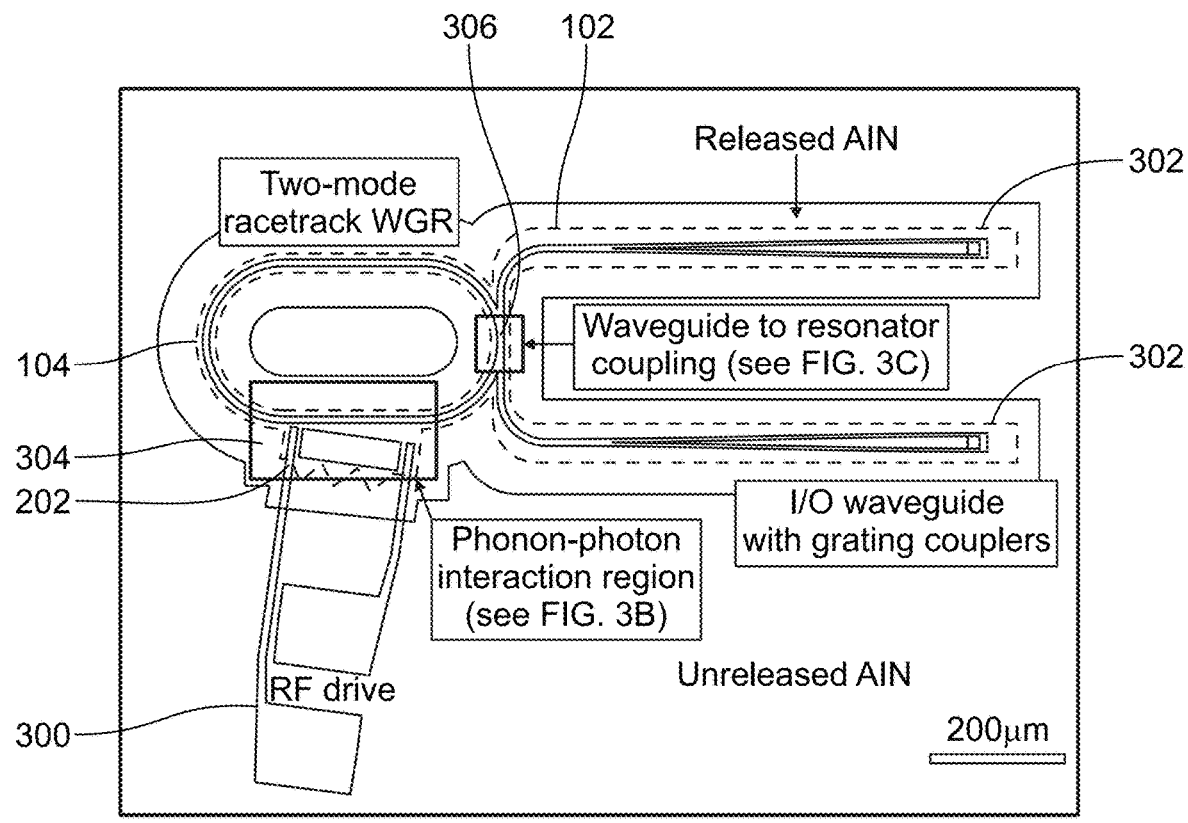
FIG. 3A
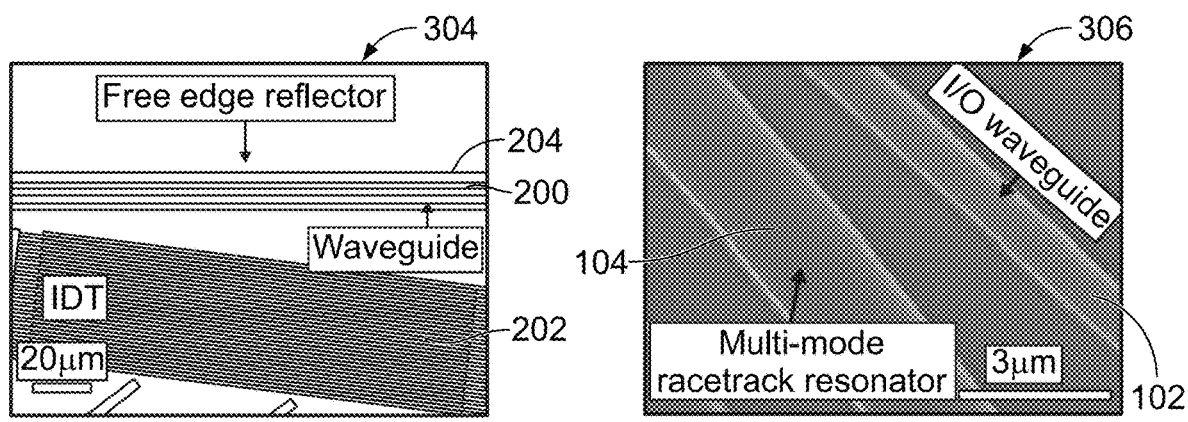
FIG. 3B
FIG. 3C

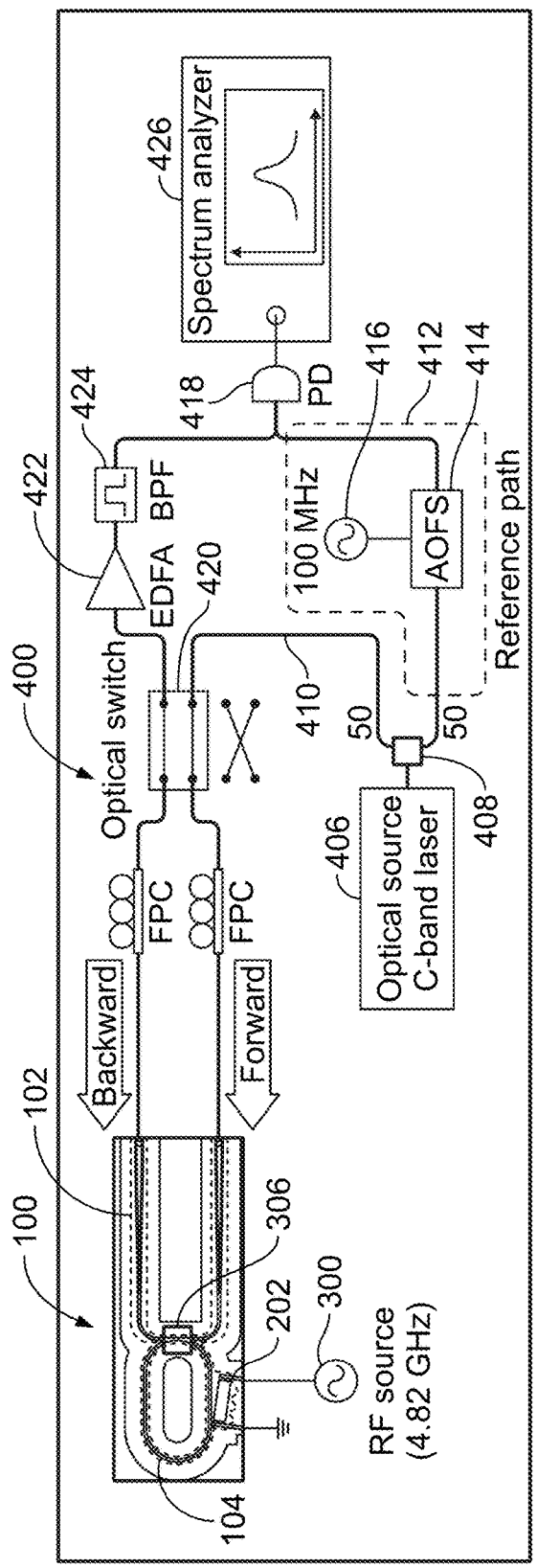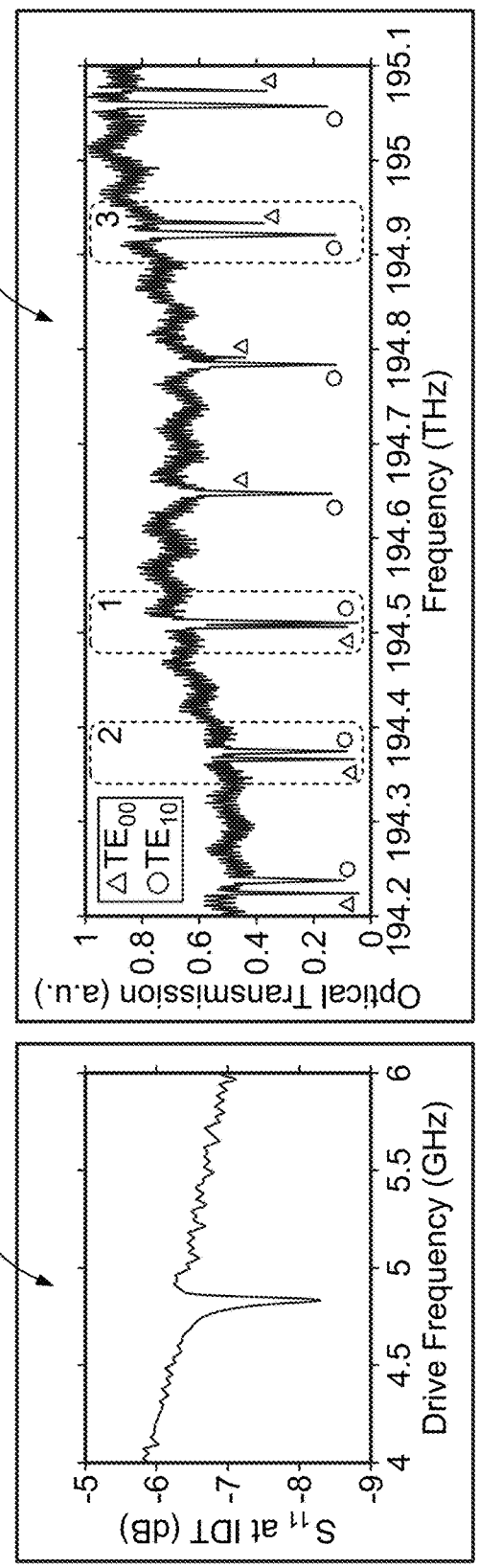
FIG. 4A
FIG. 4B
FIG. 4C

SYSTEM AND METHOD FOR BREAKING TIME-REVERSAL SYMMETRY WITH ACOUSTIC PUMPING OF NANOPHOTONIC CIRCUITS

CROSS-REFERENCE TO RELATED APPLICATION

This application claims the benefit of U.S. Provisional Application Ser. No. 62/624,151, filed Jan. 31, 2018, which is incorporated in its entirety herein.

STATEMENT REGARDING FEDERALLY SPONSORED RESEARCH OR DEVELOPMENT

This invention was made with government support under FA9453-16-1-0025 awarded by the Department of Defense, and grant number FA9550-15-1-0234 awarded by the US Air Force Office for Scientific Research (AFOSR). The government has certain rights in the invention.

BACKGROUND

Non-reciprocal devices, in which time reversal symmetry is broken for light propagation, provide functionalities for signal routing and source protection in photonic systems. Commonly encountered nonreciprocal devices include isolators and circulators, which can be implemented using a variety of techniques encompassing magneto-optics, parity-time symmetry breaking, spin-polarized atom-photon interactions, and optomechanical interactions. Recent development include using time-reversal symmetry breaking for imparting protection against defects, through analogues of the quantum Hall effect in both topological and non-topological systems.

BRIEF DESCRIPTION OF THE DRAWINGS

The features, objects and advantages other than those set forth above will become more readily apparent when consideration is given to the detailed description below. Such detailed description makes reference to the following drawings, wherein:

FIGS. 1A-D illustrate an example device for non-reciprocal photonic modulation.

FIG. 2A-D illustrate an example photon interaction with the waveguide.

FIGS. 3A-C are schematics of an example micrograph of the device.

FIGS. 4A-C illustrate an example circuit diagram and accompanying graphs.

Figure 5A:
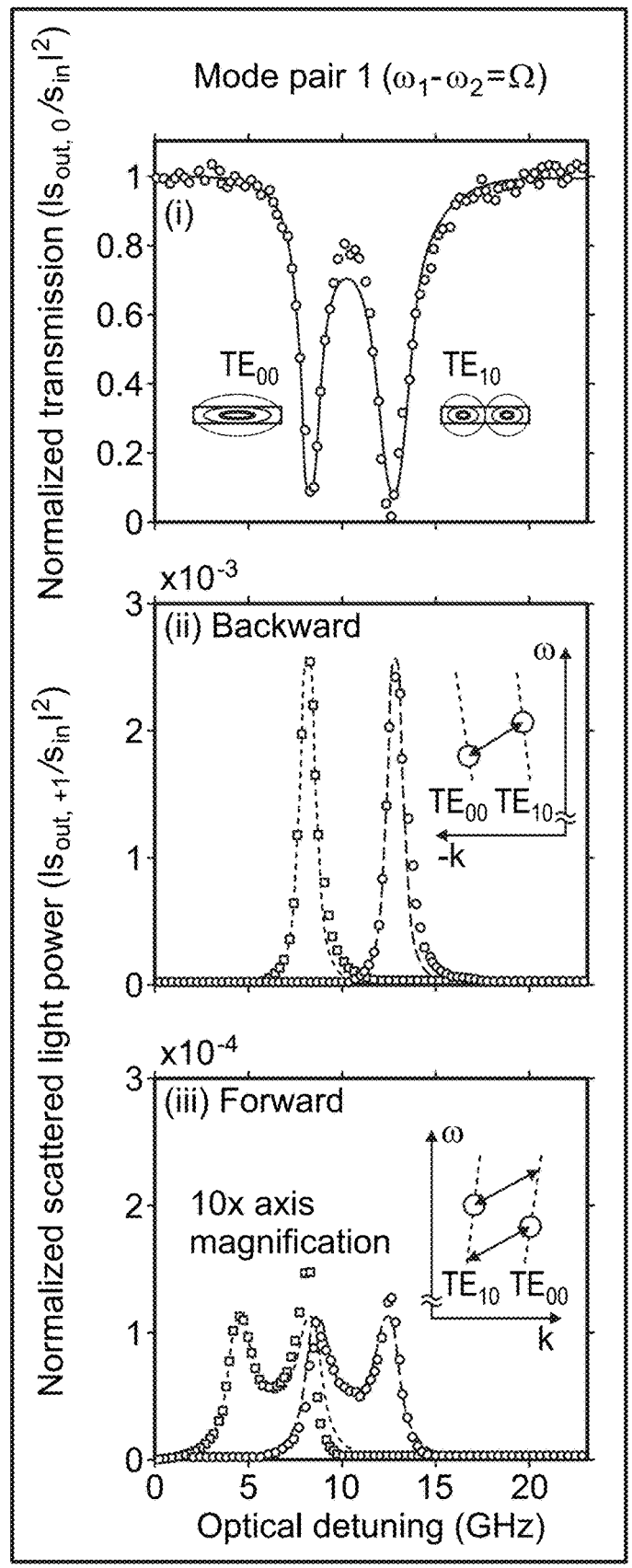
FIGS. 5A-C are graphs of example demonstrations of non-reciprocal optomechanical modulation.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

The patent or application file contains at least one drawing executed in color. Copies of this patent or patent application publication with color drawing(s) will be provided by the Office upon request and payment of the necessary fee.

DETAILED DESCRIPTION

The system and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the system and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

The use of optomechanical coupling for breaking time-reversal symmetry via momentum biasing and synthetic magnetism produces strong dispersive features without needing materials with gain or magneto-optical activity. Additionally, the potential for complete isolation with ultralow loss is an advantage over state-of-the-art in chip scale magneto-optics. These systems feature dynamic reconfigurability through the pump laser fields and can potentially be implemented in foundries with minimal process modification. Realizations of optomechanical nonreciprocal interactions to date only operate over kHz-MHz bandwidth. This fundamental constraint arises simply because the interaction is determined by the mechanical linewidth, which is traditionally 6-9 orders of magnitude lower than the optical system (potentially several THz).

As described herein, a system and method for optomechanical non-reciprocity is presented where the bandwidth of the effect is no longer determined by the mechanics, but is instead determined by the photonic modes. This can be achieved by inverting the roles of the mechanical and optical modes in an optomechanical configuration so that acoustic pumping, as opposed to optical pumping, is used to break time-reversal symmetry. Practical implications of the new pumping strategy can be transformative. There is no longer a need for any additional lasers to drive the system, and the linearity of the non-reciprocal effect is no longer limited to small optical signals. For example, an integrated nanophotonic device is produced that exhibits broken time-reversal symmetry over GHz bandwidth using a phonon pump.

Achieving non-reciprocal light propagation via stimuli that break time-reversal symmetry, without magneto-optics, remains a major challenge for integrated nanophotonic devices. Optomechanical microsystems in which light and vibrational modes are coupled through ponderomotive forces, have demonstrated strong non-reciprocal effects through a variety of techniques, but always using optical pumping. None of these approaches have demonstrated bandwidth exceeding that of the mechanical system, and all of them require optical power, which can add both fundamental and practical issues.

FIGS. 1A-D illustrate an example resonator system 100 for non-reciprocal photonic modulation, e.g., a nonreciprocal modulator. The system 100 can include a Input/Output (I/O) waveguide 102, a resonator 104 and an acoustic transducer that generates an acoustic pump wave 106. In FIG. 1A, the system 100 can provide an acoustically pumped non-reciprocal nanophotonic modulator. The resonator 104 can support multiple optical modes, e.g., $TE_{10}$ and $TE_{00}$. In some examples, the resonator 104 can include a racetrack shape, e.g., two straight sections connected with two curved sections. The pump 106 can provide an electrically driven two-dimensional acoustic wave pump that simultaneously breaks orthogonality between the optical modes while also satisfying the phase matching condition. Signals $s_{in}$ and $s_{out}$ represent input and output signals from the waveguide 102. In FIG. 1B, the transverse mode profiles, electric fields $E_1(r_\perp)$, $E_2(r_\perp)$ and material displacement u $(r_\perp)$, show the odd acoustic pump profile needed to obtain non-zero overlap integral. In FIG. 1C, the phase matching condition is illustrated in frequency-momentum space. The acoustic pump wave 106 is launched in the forward direction with frequency and momentum $(\Omega, q)$. The lower momentum optical mode ($TE_{10}$) has frequency and momentum $(\omega_1, k_1)$ and the higher momentum optical mode ($TE_{00}$) has frequency and momentum $(\omega_2, k_2)$. When the resonance frequency of the $TE_{00}$ mode is higher than of the $TE_{10}$ mode, the phase matching condition can be satisfied in the forward direction. In FIG. 1D, conversely, when the resonance frequency of the $TE_{10}$ mode is higher than the $TE_{00}$ mode, the phase matching condition is satisfied in the backward direction.

Light entering the resonator 104 from the waveguide 102 from one direction is transferred to a different optical band through phonon-mediated momentum shift and energy shift, e.g., indirect interband scattering. Light entering from the opposite direction is resonantly dissipated. The system 100 operates as a frequency shifting optical isolator exhibiting 15 dB of contrast and up to 17% mode conversion efficiency. Unlike sophisticated electro-optic implementations, acoustic phonons naturally provide large momentum shifts at practical driving frequencies. Thus, it is unnecessary to slow down the effective phase velocity of the pumping signal to achieve indirect interband scattering using a phononic pump. The acoustic method also circumvents free carrier absorption that otherwise generates large losses in electrooptic waveguides.

In some examples, for the sake of explanation, an optomechanically-active resonator 104 supports quasi-$TE_{10}$ ($\omega_1$, $k_1$) and quasi-$TE_{00}$ ($\omega_2$, $k_2$). For convenience the 'quasi-' prefix is dropped. Indirect intermodal scattering can be enabled between the optical modes as a result of the photoelastic perturbations of the medium by the driven acoustic wave $(\Omega, q)$. While this optically resonant structure sacrifices the bandwidth over which acousto-optical interactions can occur, it provides giant opto-acoustic gain that is necessary to obtain appreciable light-vibration coupling within a small form factor. The requisite phase matching conditions are illustrated in $\omega$–k space in FIGS. 1C-D. Under normal conditions, the $TE_{00}$ momentum is higher than that of the $TE_{10}$ mode (e.g. $k_2 > k_1$).

In FIG. 1C, the resonance frequency of the $TE_{00}$ racetrack mode is higher than that of the $TE_{10}$ mode ($\omega_2 > \omega_1$). An acoustic transducer (not shown) can be placed on the resonator 104 to generate phonons ($\omega$, q) between the modes can help satisfy the phase matching condition ($\omega = \omega_2 - \omega_1$, $q = k_2 - k_1$) for acousto-optical scattering for forward propagating optical signals. The acoustic transducer (not shown) results in the 2-D acoustic pump 106. For light propagating in the opposite direction, the momentum difference between the optical modes is now $(\Omega, -q)$ which is not satisfied by the driven phonons. Thus, due to the phase matching condition the system 100 exhibits broken time-reversal symmetry, e.g. intermodal scattering is permitted only for forward signals while the backward signals see no such effect. The case shown in FIG. 1D where the resonance frequency relation is opposite. In this case the phase-matching of scattering between the optical modes requires phonons having $(\Omega, -q)$ in the forward direction and $(\Omega, q)$ in the backward direction. Thus, forward propagating phonons can only phase-match backward propagating optical modes.

In addition to the above phase matching requirement, the acoustic wave also assists with breaking orthogonality. When both optical modes are of TE polarization, the intermodal optomechanical coupling coefficient ($\beta$) is proportional to the cross-sectional overlap integral of the optical modes $E_1(r_\perp)$, $E_2(r_\perp)$ and the acoustic mode displacement u $(r_\perp)$ given by:

$$\beta \propto \iint E_1(r_\perp) E_2(r_\perp)(\nabla \cdot u(r_\perp)) d^2 r_\perp \quad (1)$$

As shown in FIG. 1B, the electric fields of $TE_{10}$ and $TE_{00}$ modes have odd and even shapes in the transverse direction, respectively. Therefore, the density variation associated with the acoustic wave is asymmetric with respect to the center of the waveguide to ensure non-zero $\beta$. In the case where the node is located exactly at the center of the waveguide, the intermodal coupling can be maximized while simultaneously suppressing intramodal scattering by balancing out compressive and tensile strain in the waveguide.

The acousto-optic interaction in the forward phase matched case in FIG. 1C can be described using the coupled equations of motion for the optical fields:

$$\frac{\partial}{\partial t}\begin{pmatrix}a_1\\a_2\end{pmatrix}=-i\begin{pmatrix}\omega_1-i\kappa_1/2 & G_{ph}^*e^{i\Omega t}\\G_{ph}e^{-i\Omega t} & \omega_2-i\kappa_2/2\end{pmatrix}\begin{pmatrix}a_1\\a_2\end{pmatrix}+\begin{pmatrix}\sqrt{\kappa_{ex1}}\\\sqrt{\kappa_{ex2}}\end{pmatrix}s_{in}e^{-i\omega_1 t} \quad (2)$$

where $a_1$ ($a_2$) is the intracavity field, $k_1$ ($k_2$) is the loaded decay rate of the $TE_{10}$ ($TE_{00}$) mode, $G_{ph}=\beta u$ is the phonon-enhanced optomechanical coupling rate, and u is displacement associated with the acoustic pump wave 106. Here, it is assumed that an input field $s_{in}$ at carrier frequency $\omega_l$ is provided to the resonator via an evanescently coupled waveguide 102 with coupling rates $k_{ex1}$ and $k_{ex2}$ to the $TE_{10}$ and $TE_{00}$ optical racetrack modes, respectively. In the case where the $a_2$ mode is probed, the optical susceptibility can be expressed as $X_{om}(\omega)=[k_2/2+i(\omega_2-\omega)+\alpha(\omega)]^{-1}$ where $\omega$ is Fourier frequency and $\alpha(\omega)=|G_{ph}|^2/[k_1/2+i(\omega_1+\Omega-\omega)]$ is an additional optical loss rate induced by the acousto-optic interaction. In contrast, conventional "optically pumped" optomechanical systems have an interaction term of the form $\alpha(\omega)=|G|^2/[\Gamma/2+i(\Omega_m+\omega_p-\omega)]$ where $G=\beta a_1$ is the photon-enhanced optomechanical coupling rate, $\Gamma$ is decay rate of the mechanical mode, $\Omega_m$ is the mechanical resonant frequency, and $\omega_p$ is the pump laser frequency provided by an external pump laser. It can be seen that the interaction bandwidth in the acoustically pumped case is no longer defined by the linewidth $\Gamma$ of the mechanical mode, but instead by the linewidth $k_1$ of the $a_1$ optical mode. This enables an orders-of-magnitude higher bandwidth non-reciprocal interaction.

FIG. 2A-D illustrate an example photon-phonon interaction region of the resonator 104. This region of the resonator 104 can include a waveguide 200 and an interdigitated transducer (IDT) 202 positioned near the waveguide 200. In some examples, the IDT 202 can generate a two-dimensional acoustic pump wave that provides momentum in both transverse and propagating directions. In some examples, the IDT 202 can provide the acoustic pump wave at an oblique angle in relation to the resonator waveguide 200. A pitch of the IDT 202 (e.g., $\Lambda$=546 nm) determines total momentum of driven phonons, while the angle of the IDT 202 (e.g., $\theta$=7.06°) determines the ratio between transverse and propagating phonon momenta. The resonator waveguide 200 can be positioned between a free edge reflector 204 and the IDT 202 so that travelling and reflected phonons form a standing acoustic wave in the transverse direction and its node is placed in the middle of the resonator waveguide 200. In some examples, the resonator waveguide 200 includes a ridge 206, e.g., positioned in the middle of the resonator waveguide 200.

Example Mechanical Transduction and Electronic Characterization

The IDT 202 can be used for exciting Lamb wave acoustic modes on the AlN piezoelectric substrate. RF signals are provided to the IDT 202 via a ground-signal-ground (GSG) probe (Cascade Microtech model ACP 40). The transduction efficiency of the IDT 202 can be characterized using a vector network analyzer (Keysight model E5063A) through measurement of the reflection coefficient ($s_{11}$). The vector network analyzer is calibrated using an on-chip impedance calibration standard to remove any effect of cables and the GSG probe.

FIG. 2B illustrates and example cross-section schematic of the phonon interaction region of the waveguide 200. FIG. 2C illustrates a finite element method (FEM) simulated mode shapes of the $TE_{10}$ and $TE_{00}$ optical modes and the $S_0$ acoustic wave. FIG. 2D illustrates an isometric view of an example two-dimensional acoustic wave propagating along the waveguide 200. As illustrated best in FIGS. 2A-B, the resonator 104 can be fabricated as an aluminum nitride (AlN) layer 208 on an air platform 210, e.g., having an underlying silicon handle wafer forming an air gap 212. The selection of materials can ensure Complementary Metal Oxide Semiconductor (CMOS) compatibility. The AlN layer 208 supports the optical modes due to its high transparency in the telecom band and additionally functions as an excellent acoustic material on which phonons can be piezoelectrically driven, e.g., FIGS. 2C-D. An example fabrication process is discussed below. The resonator 102 supports the $TE_{00}$ and $TE_{10}$ modes around 1550 nm using a wrapped ridge waveguide. Other optical modes are suppressed by limiting the width (e.g., 2.2 μm) and thickness (e.g., 350 nm) of the AlN layer 208. The optical modes of the resonator 104 are accessed through an adjacent linear single-mode waveguide with a width of 800 nm that is coupled evanescently to the resonator 104 at a single point. Grating couplers at the ends of the linear I/O waveguide 102 can be used to provide optical access to the I/O waveguide 102. The I/O waveguide 102 geometries can be evaluated using electron microscopy, which permitted more accurate refinement and finite-element simulation of the optical modes in Comsol Multiphysics. This procedure also allows for evaluation of the material refractive index as (e.g., $n_{AlN}$=2.07) by matching against experimental measurement of the free spectral range (FSR) of each optical mode family within the resonator 104. The frequency difference between pairs of optical resonances varies due to the distinct dispersion of the $TE_{00}$ and $TE_{10}$ mode families, e.g., FIG. 4C described below.

In some examples, the acoustic pump 106 is provided to the resonator 104 using IDT 202 that is fabricated on the piezoelectric AlN substrate 208. The IDT pitch and angle can be selected carefully in order to generate a two-dimensional acoustic wave having the correct momentum in both propagating and transverse directions, FIG. 2A. In order to satisfy momentum conservation in the propagating direction, an acoustic propagation constant of $g_{propagating}$=3.54×$10^5$ $m^{-1}$ is provided. Since a standing wave in the transverse direction is simultaneously required, the acoustic free edge reflector 204 can be fabricated by cutting the AlN device layer 208 through to the air gap 212 below, FIGS. 2A-B. In some examples, the free edge reflector 204 is placed at 2X away from the waveguide 200 in order to situate an acoustic node at the center of the waveguide and obtain an odd transverse profile, FIG. 1B.

Based on example simulations, the cross-sectional overlap integral $\beta$ is maximized when the transverse acoustic wavelength and the width of the optical wave guide are matched, setting transverse propagation constant to $g_{transverse}$=$2\pi/2.2$ $\mu m^{-1}$=$2.86\times10^6$ $m^{-1}$. Accounting for the transverse and propagating components of the acoustic wave, the total wave vector of the acoustic wave launched by the IDT 202 is calculated as $g_{total}=\sqrt{q^2_{propagating}+q^2_{transverse}}\approx2.88\times10^6$ $m^{-1}$. The IDT angle is then set to $\Theta=\tan^{-1}(g_{propagating}/g_{transverse})$=7.06°, and pitch to $\Lambda=\pi/2g_{total}$=546 nm. The driving frequency of 4.82 GHz can be calculated using finite element simulation of the $S_0$ Lamb surface acoustic wave dispersion for the selected propagation constant. FIG. 2D presents an example simulation of the two-dimensional acoustic mode shape in the racetrack waveguide region of the resonator 104. The intermodal modulation frequency and momentum can be tailored for different phononic and photonic modes by simply modifying the IDT parameters, without changing material phonon dispersion.

Example Device Fabrication

The c-axis oriented 350 nm film of aluminum nitride (AlN) is directly deposited by RF sputtering onto a silicon wafer. The AlN layer quality can be confirmed through X-ray rocking curve measurement and stress measurement. The measured full width at half maximum from the rocking curve can be 1.78 degrees. The average stress of the AlN film can be measured as −3.8 MPa (in compression). The devices can be patterned through three electron-beam lithography steps. First, the AlN waveguide 102 and racetrack resonator 104 can be patterned using e-beam lithography (Raith E-line) on ZEP-520 resist (ZEON corporation), followed by an etching of 200 nm AlN using $Cl_2$ based inductively coupled plasma reactive ion etching (ICP-RIE). Next, release holes and the acoustic edge reflector can be patterned using e-beam lithography on double spin coated ZEP-520 resist, followed by a complete etch back of the 350 nm AlN through ICP-RIE. Finally, the interdigitated transducers (IDTs) 202 can be patterned using e-beam lithography on PMMA photoresist after which 60 nm of Al is deposited using an e-beam evaporator. A subsequent lift-off process defines the aluminum IDTs 202. Finally, a gas-phase isotropic silicon etch can be performed using XeF2 to release the system 100. Unrealized AlN are regions where there is no air underneath the AlN. Micrographs of an example fabricated system 100 are described in FIGS. 3A-C.

FIGS. 3A-C illustrate example micrographs of the system 100. FIG. 3A illustrates the system 100, including a radio frequency (RF) drive 300, e.g., to power the IDT 202, grating couplers 302 coupled with the I/O waveguide 102. The grating couplers are used to bring light from external optical fibers into the I/O waveguide. In some examples, the system 100 forms an acoustically pumped non-reciprocal nanophotonic modulator, as described herein. FIG. 3B illustrates a close up of the phonon-photon interaction region 304 showing the IDT 202 and the free edge acoustic reflector 204. FIG. 3C illustrates an example SEM image of the 2.2 μm width racetrack resonator waveguide 104 and the 800 nm single mode I/O waveguide 102 in the evanescent coupling region 306.

FIGS. 4A-C illustrate an example optical circuit diagram 400 and accompanying graphs 402, 404. Light from a laser probe 406 can be split with a 50:50 coupler 408 to prepare a device probing path 410 and a reference path 412. In some examples the probe laser 406 is a tunable external cavity diode laser. Other types of lasers can be used. An acousto-optic frequency shifter (AOFS) 414 can offset the reference path based on a 100 MHz reference signal 416 to enable heterodyne detection via a high speed photodetector (PD) 418. An off-chip optical switch 420 controls the directionality of the light entering the on-chip I/O waveguide 102. The light coming out from the device can be amplified using an erbium-doped fiber, or other, amplifier (EDFA) 422 to compensate the loss from the grating coupler. A tunable band pass filter (BPF) 424 can be placed to filter out the extra noise produced by the EDFA 422. A vector network spectrum analyzer 426 can display the signals detected by the photodetector 418. In FIG. 4B, an example measured reflection coefficient ($s_{11}$ response) of the IDT 202 is graphed using the analyzer 426. In FIG. 4C, an example measured optical transmission can be graphed without acoustic drive. Triangles and circles represent optical modes of the $TE_{00}$ and $TE_{10}$ families, respectively. Mode pairs 1, 2, and 3 are used for an intermodal scattering experiment, in FIG. 5.

In some examples, the non-reciprocal modulation within the system 100 can be demonstrated by measuring the optical sidebands for both forward and backward probe signals, e.g., using the measurement setup shown in FIG. 4A. The primary acoustic component of the system 100, e.g. the IDT 202, is first characterized using s-parameter measurement (FIG. 4B) using a calibrated RF probe by means of the analyzer 426. The measured reflection coefficient ($s_{11}$ parameter) shows a resonant dip corresponding to efficient conversion of the input electronic stimulus into the acoustic wave. This characteristic acoustic resonance can be directly measured at 4.82 GHz, corresponding to the $S_0$ Lamb surface acoustic wave on the AlN substrate. In FIG. 4C, the measured optical transmission spectrum is presented from the perspective of the coupling waveguide 306, where the transmission dips corresponding to the modes of the resonator 104 are clearly visible. The $TE_{00}$ mode is seen to have higher Q factor ($Q_{TE_{00},loaded} \approx 170,000$) than the $TE_{10}$ mode ($Q_{TE_{10},loaded} \approx 102,000$). In some examples, the measured free spectral ranges (FSR) of $TE_{00}$ and $TE_{10}$ resonances are respectively 140.5 GHz and 136 GHz near 194.7 THz optical frequency. Therefore, the inter-modal frequency difference changes by approximately 4.5 GHz for each consecutive mode pair. On the other hand, the momentum difference of each mode pair is the same since the azimuthal mode order of the pairs is the same.

Optical Measurements

For performing measurements of intermodal light scattering, the experimental setup shown in FIG. 4A can be used. An optical switch 420 (e.g., Thorlab model OSW22-1310E) can be used to control the light propagation direction, either forward or backward through the optical waveguide 102. A 1520-1570 nm tunable external cavity diode laser (e.g., New Focus model TLB-6728-P, <50 kHz instantaneous linewidth) can be used to generate the optical probe 406. The splitter 408 can split the laser source 50:50 into a device path and a reference path for performing heterodyne detection of the scattered light spectrum. Light in the device path can be coupled to the on-chip waveguide 102 through grating couplers. An erbium-doped fiber amplifier (EDFA) 422 can be used to amplify the light exiting the waveguide 102 to facilitate detection. Light in the reference arm can be provided a predetermined offset (e.g., 100 MHz) using an in-fiber acousto-optic frequency shifter 424 (e.g., AOFS, Brimrose model AMF-100-1550). The beat note between the reference light and the scattered light can be measured by the high frequency photodetector 418 (e.g., a Newport model 1554 photoreceiver).

Figure 5B:
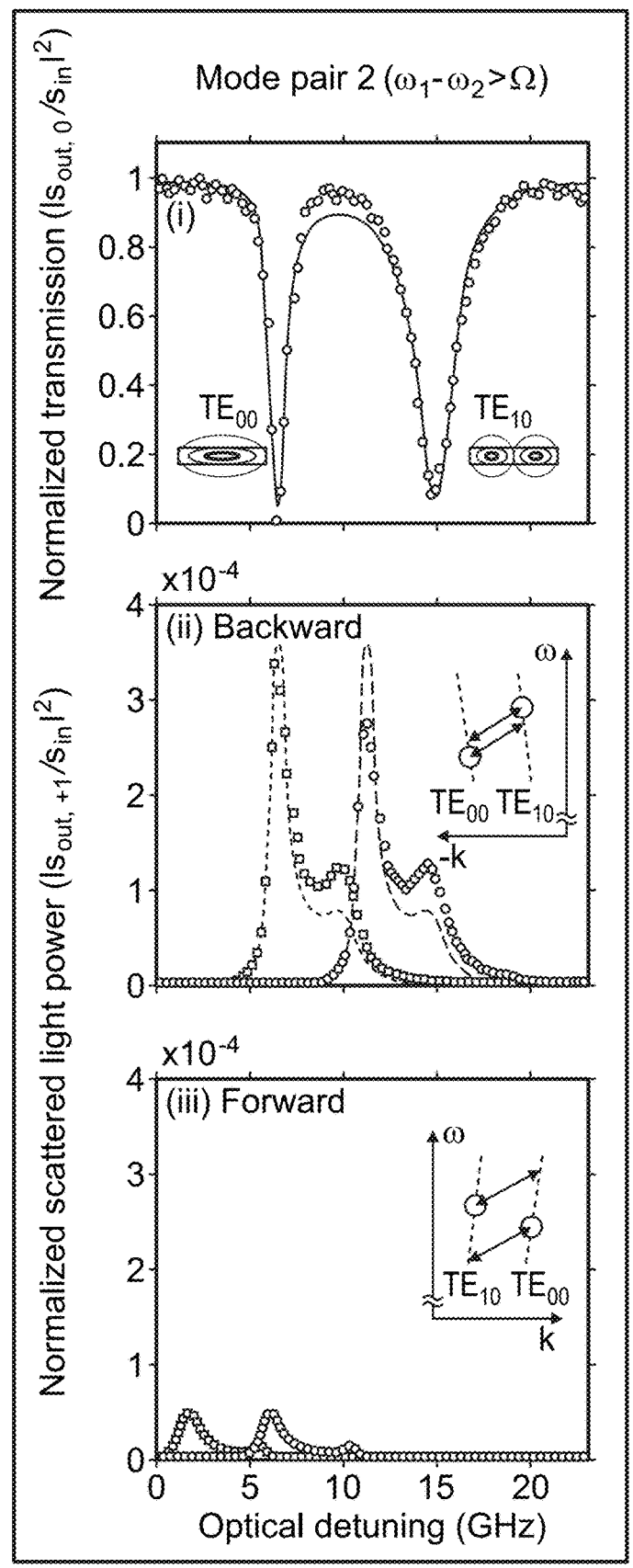
Figure 5C:
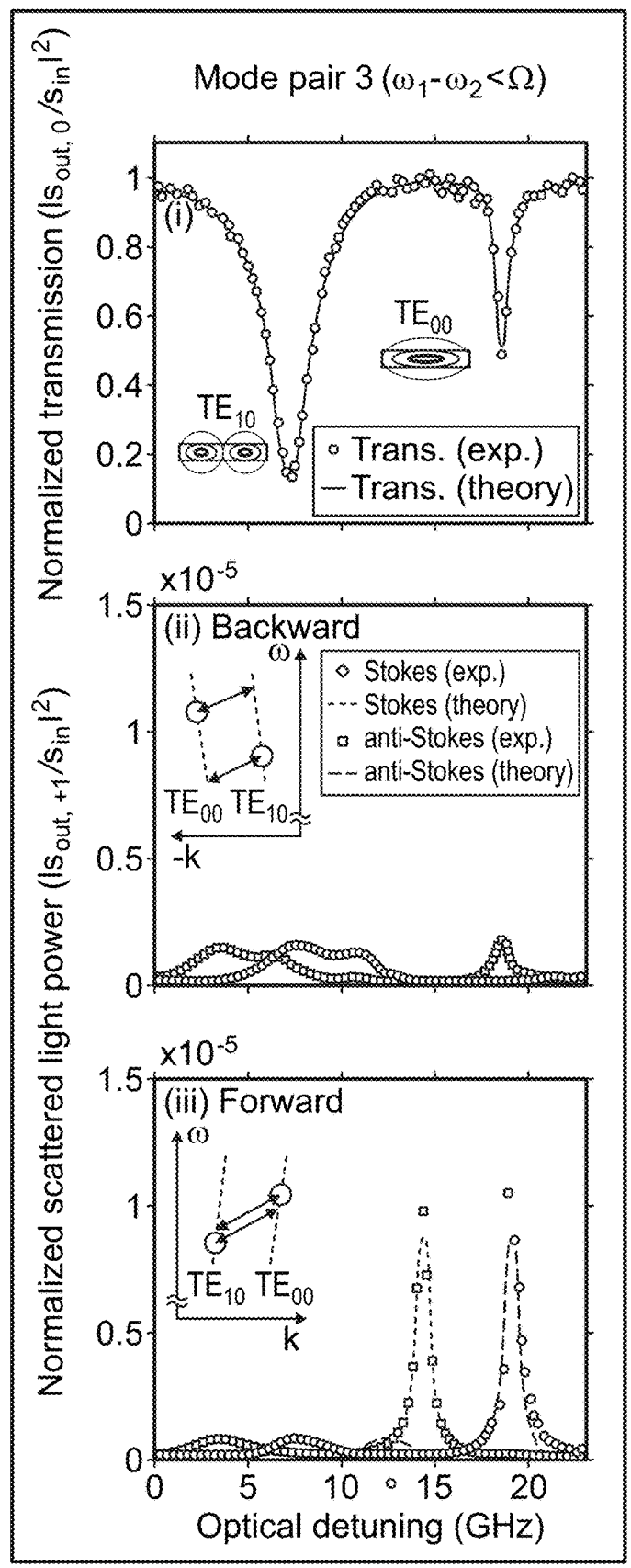

Example experimental measurements of the interband mode conversion are presented in FIG. 5. Three cases corresponding to mode pairs 1, 2, 3 as marked in FIG. 4C, which serve to illustrate both perfect and imperfect phase matching situations within the system 100 are considered. As mentioned above, the mode pairs all have identical separation in momentum-space. In this example, the RF frequency is fixed to 4.82 GHz where the IDT 202 can most efficiently actuate the acoustic wave. The optical laser probe 406 is swept across each pair of modes while measuring the power of transmitted carrier frequency component ($s_{out,0}$), down-converted Stokes sideband ($s_{out,-1}$), and up-converted anti-Stokes sideband ($s_{out,+1}$) (FIGS. 5A-C, graphs i, ii, iii) simultaneously. The measured power is normalized against the input power to the waveguide ($s_{in}$). The RF drive power is set to 0 dBm so that the optical sidebands are small compared to the input light.

FIGS. 5A-C are graphs of example demonstrations of non-reciprocal optomechanical modulation. Three cases corresponding to the optical mode pairs indicated in FIG. 4C are presented. In FIG. 5A, mode pair 1 corresponds to a near-perfect backward phase-matching condition. Here the optical modes are separated by $\omega_2-\omega_1=4.55$ GHz ($TE_{00}$ mode is located at lower frequency) such that a 4.82 GHz acoustic mode has the correct momentum to enable phase matching. In FIG. 5B, mode pair 2 corresponds to $\omega_2-\omega_1=8.01$ GHz corresponding to imperfect phase matching. In FIG. 5C, mode pair 3 ($\omega_2-\omega_1=-11.76$ GHz) has the $TE_{00}$ mode located at higher frequency. Therefore, phase matching is satisfied in the forward direction. The top row (i) represents the transmitted signal at the optical carrier frequency component, the second row (ii) represents measurements of Stokes and anti-Stokes sidebands when the system 100 is probed in the backward direction, and the third row (iii) represents sideband measurements for forward probing. Legends corresponding to FIGS. 5A-C are presented in FIG. 5C.

Sideband generation and reciprocity are analyzed in the case where both phase matching and the frequency matching are well satisfied, FIG. 5A. The optical resonance frequency of the $TE_{00}$ mode is lower than the resonance frequency of the $TE_{10}$ optical mode by 4.55 GHz, implying that the phase matching condition is satisfied in the backward direction for a forward directed phonon pump (as illustrated in FIG. 1D). Example measurements show (FIG. 5A, ii) that when each optical mode is probed in the backward direction, resonant sideband generation occurs with the assistance of the second optical mode. For laser detuning between 5-10 GHz (arbitrary reference) light from the I/O waveguide 102 primarily enters $TE_{00}$ mode resulting in a strong anti-Stokes sideband. Scattering to Stokes is strongly suppressed (45 dB smaller than the anti-Stokes) since there is no optical mode available in the resonator. Similarly, for laser detuning between 10-15 GHz, light from the I/O waveguide 102 primarily enters the $TE_{10}$ mode, and only the Stokes sideband is generated through resonant enhancement from the $TE_{00}$ optical mode. Based on the fitting of the experimental data, a −3 dB bandwidth (full width half maximum) of ~1.14 GHz is obtained for this modulation effect, which is determined by the optical resonance linewidths. The intermodal optomechanical coupling coefficient can also be quantified as B=0.209 GHz/nm.

On the other hand, when light enters the system 100 in the forward direction where the momentum matching condition is not satisfied, very small light scattering is observed (FIG. 5A, iii). At the laser detuning where the maximum sideband amplitude is obtained in the backward direction, the sideband generated for forward probing is ~15 dB smaller than that obtained for a backward laser probe. The measurement presented in FIG. 5A, iii is magnified by 10× in order for the data trends to be observable. The residual scattering that is observed has the characteristic functional shape of conventional intramodal modulation occurring from optical path length change. While this effect should nominally be zero, there are practical constraints associated with non-zero overlap integral due to acoustic-optical misalignment and the curvature of the racetrack resonator 104.

The case of mode pair 2 is examined, where the optical modes have a larger (8.01 GHz) frequency separation but have identical momentum relationship (FIG. 5B). Here, the modes are frequency-mismatched with respect to the acoustic pump frequency, resulting in much lower indirect intermodal scattering. For a backward optical probe entering the system 100, two Lorentzian shapes in both Stokes and anti-Stokes sideband data are observed, corresponding to some intermodal conversion even though the phonon stimulus is non-resonant. The larger Lorentzian signature appears due to scattering from the peak of the $TE_{00}$ resonance to off-resonance on the $TE_{10}$ mode. Conversely, the smaller Lorentzian signature corresponds to scattering from an off-resonance point on the $TE_{00}$ mode to the peak of the $TE_{10}$ mode.

In the case of mode pair 3, opposite to mode pairs 1 and 2, the frequency of the $TE_{00}$ mode is lower than the $TE_{10}$ mode by 11.76 GHz. The phase matching in this case is thus only possible to satisfy in the opposite direction, e.g. for forward optical probing, corresponding to the situation shown in FIG. 1C. Measurements of light scattering for this mode pair (FIG. 5C) clearly show greater intermodal conversion for forward input light, even though the frequency matching for the modes is poor. Backward optical probing exhibits much smaller sidebands due to the momentum mismatch. All the above measurements clearly showcase how the two-dimensional acoustic pump can be used to satisfy frequency and momentum phase-matching in either forward or backward directions, while also producing the necessary transverse overlap integral.

Figure 6:
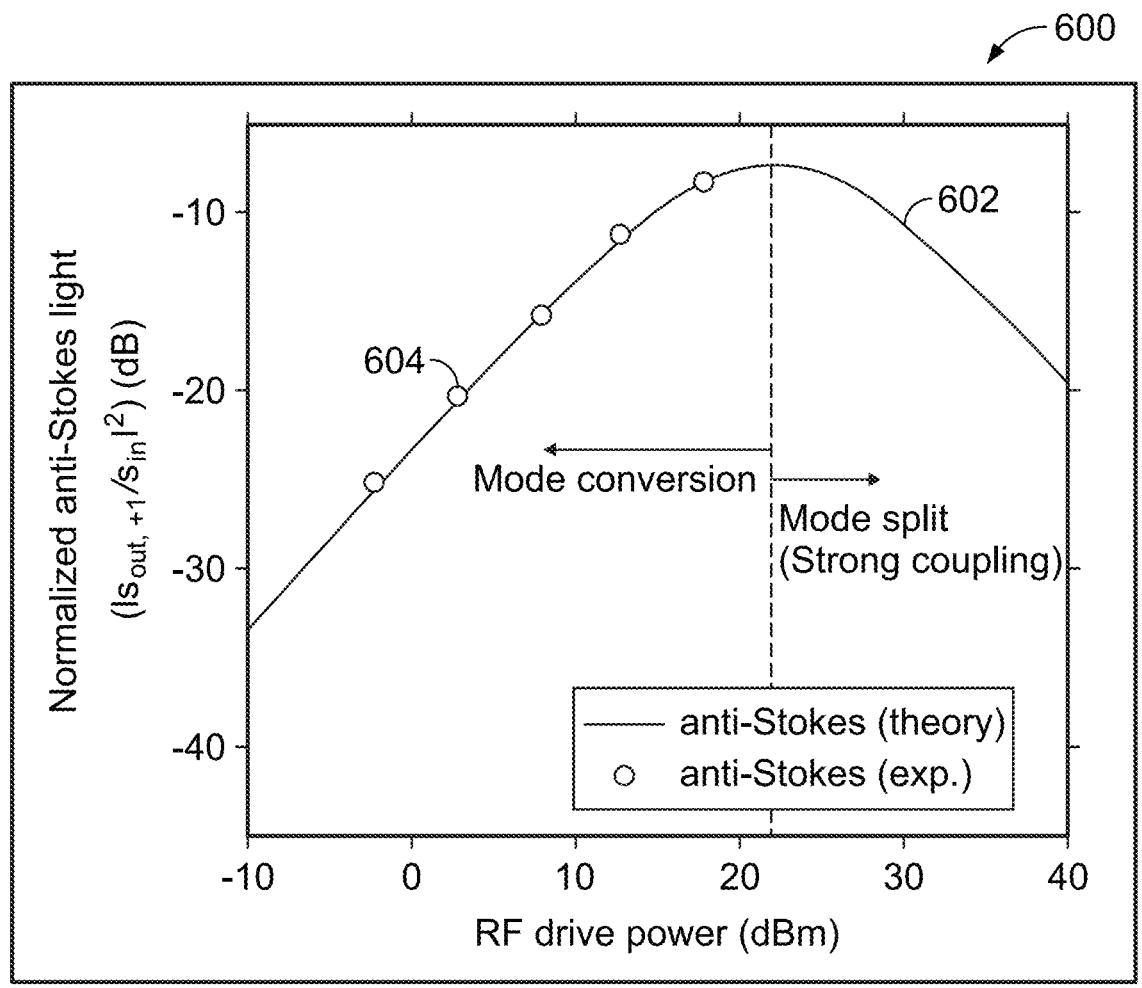
FIG. 6 is a graph of example modulation efficiency measured as a function of RF drive power for mode pair 1 in FIG. 5A.

FIG. 6 is a graph 600 of example modulation efficiency measured as a function of RF drive power for mode pair 1 in FIG. 5A. The probe laser 406 is fixed on the resonance of $TE_{00}$ mode in the backward direction, e.g., phase matched direction. The example curve 602 is calculated based on fitting the data from FIG. 5A, and predicts that the system 100 enters the strong coupling regime when RF drive power goes beyond 21 dBm. Beyond this point the coupled optical modes exhibit splitting and sideband conversion reduces, essentially turning the system 100 into a linear optical isolator. When the probe laser 406 is applied in the backward direction and is detuned from the $TE_{00}$ resonance at the offset where the maximum anti-Stokes sideband 604 is generated. The RF power stimulus to the IDT 202 is then swept from −2.8 dBm to 17.8 dBm while the anti-Stokes sideband 604 strength is measured (FIG. 6).

The example curve 602 in FIG. 6 can be produced using experimentally measured parameters (e.g., mode linewidths, coupling rates, optomechanical coupling coefficient) from fitting the data previously shown in FIG. 5A. At low drive power, when the sideband amplitude is much smaller than the carrier intracavity field, the mode conversion efficiency linearly increases with the pump. A maximum of 17% sideband conversion efficiency on resonance is achieved when using 17.8 dBm RF input power. The optomechanical coupling rate at this drive power is calculated to be $G_{ph}$=0.609 GHz. In a resonant structure, maximum sideband conversion is achievable at the equilibrium point where the amplitudes of the sideband and intracavity optical carrier field are matched since the rate of up and down conversion are then equal. Pumping beyond this point, e.g. $|G_{ph}|^2 > k_1 k_2/4$, pushes the system 100 into the strong coupling regime where the coupled optical modes begin to split. In this regime, for even stronger pumping, the sideband amplitude decreases while the optical carrier frequency component propagates nonreciprocally. In other words, the system 100 begins to operate as a linear optical isolator. The solid line in FIG. 6 is not a curve fit, but is a prediction of sideband field relative to the RF input. The conversion efficiency of the system 100 may be improved by forming an acoustic waveguide, e.g. transverse acoustic resonator, by using free edge reflectors on both sides of the optical waveguide 200, e.g., as demonstrated in H. Shin, W. Qiu, R. Jarecki, J. A. Cox, R. H. Olsson III, A. Starbuck, Z. Wang, and P. T.

Rakich, "Tailorable stimulated Brillouin scattering in nanoscale silicon waveguides," Nature Communications, vol. 4, 1944, 2013.

The system 100 as a nanophotonic system can operate as a frequency shifting isolator in which light propagating in one direction experiences a fixed frequency offset, while in the opposite direction light is absorbed. This type of non-reciprocal device can be used in different applications, e.g., in compact atomic timekeeping, cold-atom inertial navigation, and gravimetry, e.g., in which magnet-induced Zeeman shifts and light shifts are extremely undesirable, etc. Moreover, the operational optical wavelength and pumping strategy are lithographically defined, which ensures rapid adaptability to other wavelength regimes. More broadly, the acoustic pumping technique and the level of performance achieved indicates a path towards foundry-compatible integration of linear isolators, circulators, and non-reciprocal phase shifters, that may overcome the fundamental challenges currently plaguing state of the art non-magnetic non-reciprocal devices. Other applications can include new non-reciprocal functionality to chip-scale photonics including frequency shifters and dynamic converters for mode division multiplexing.

Dynamics of Traveling Acousto-Optical Interaction

Figure 7:
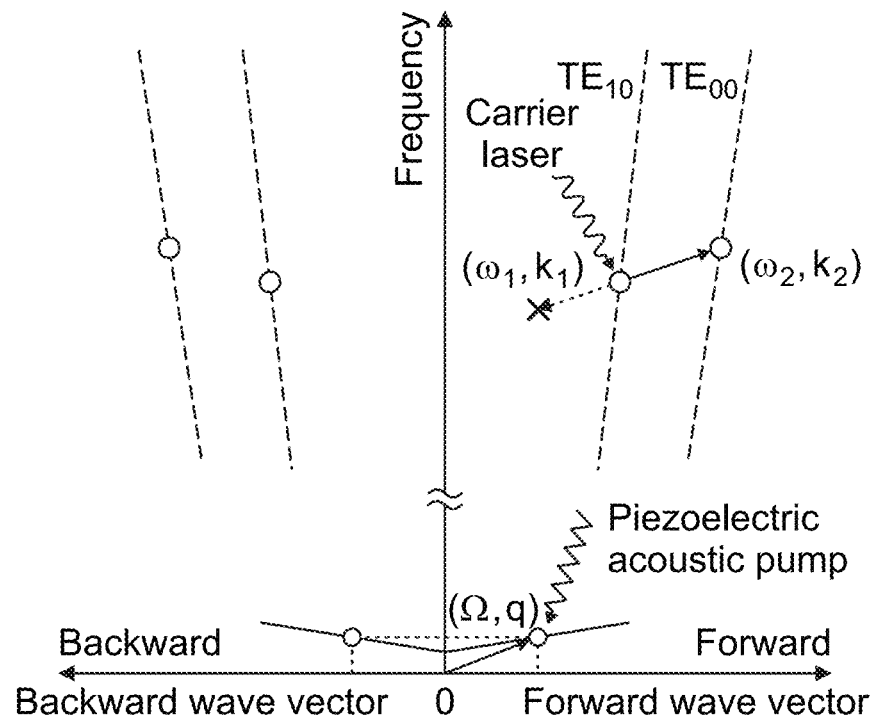
FIG. 7 illustrates example graphs of (a) the intermodal scattering illustrated in frequency-momentum space and (b) the intermodal scattering process illustrated in frequency domain.
Figure 7:
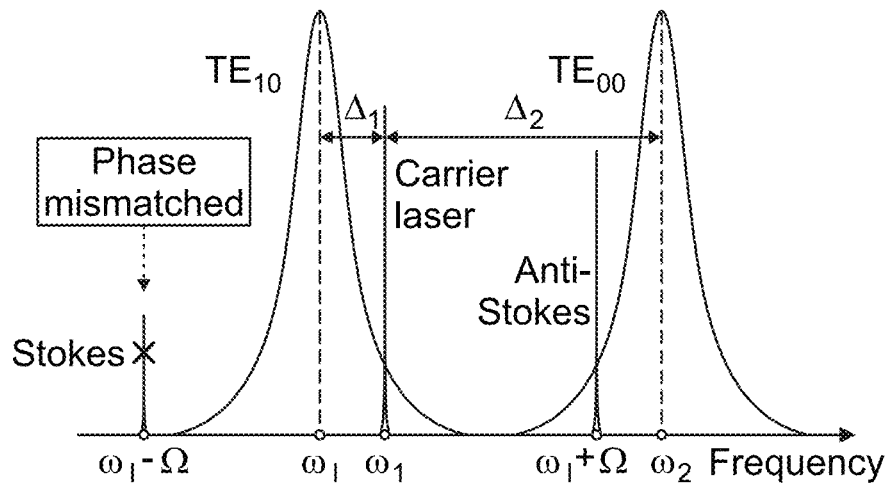
Figure 8:
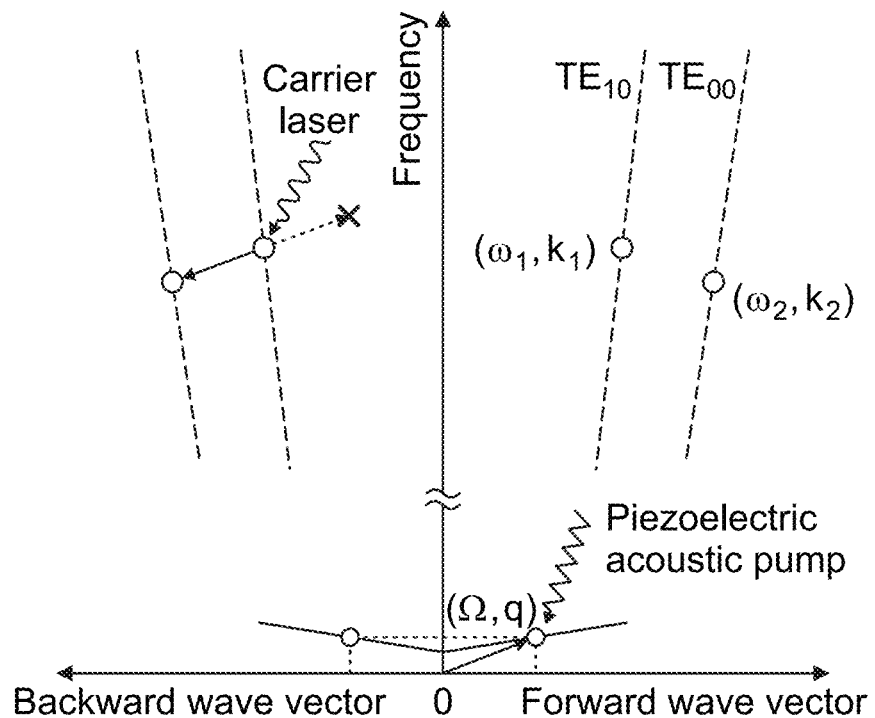
FIG. 8 illustrates example graphs of (a) the intermodal scattering illustrated in frequency-momentum space and (b) the intermodal scattering illustrated in frequency domain.
Figure 8:
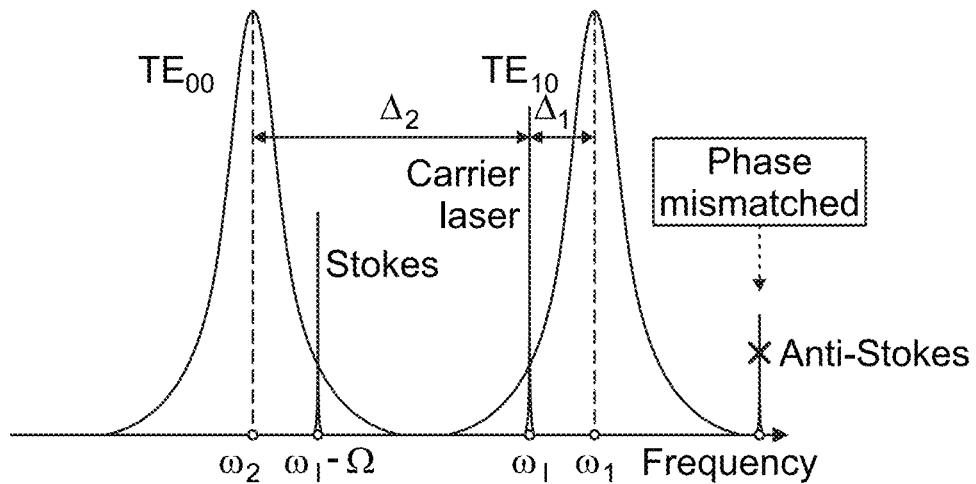

FIG. 7 illustrates example graphs of (a) the intermodal scattering illustrated in frequency-momentum space and (b) the intermodal scattering process illustrated in frequency domain. FIG. 8 illustrates example graphs of (a) the intermodal scattering illustrated in frequency-momentum space and (b) the intermodal scattering illustrated in frequency domain. In FIG. 7, in the case where the carrier laser is presented to the $TE_{10}$ mode in the forward direction, the anti-Stokes sideband is resonantly enhanced by the $TE_{00}$ resonance mode. The Stokes sideband is suppressed since there is no optical mode available. Due to the energy-momentum phase matching condition, only the anti-Stokes sideband appears in, which is located at the frequency $\omega_l + \Omega$.

In FIG. 8, in the case where the carrier laser is presented to the $TE_{10}$ mode in the backward direction, the Stokes sideband is resonantly enhanced by the $TE_{10}$ mode. The anti-Stokes sideband is suppressed since there is no optical mode that allows scattering. Due to the phase matching condition, only the Stokes sideband appears, which is located at the frequency $\omega_l - \Omega$. In some examples, the current system 100 can include two optical modes in a racetrack resonator 104 (quasi-$TE_{10}$ ($\omega_1$, $k_1$) and quasi-$TE_{00}$ ($\omega_2$, $k_2$)) that are coupled by means of the acoustic pump 106 ($\Omega$, q). The directionality of the acoustic pump 106 can be determined via the electromechanical driving stimulus. With respect to the pump 106, "forward" is determined as the direction in which the light and the acoustic pump 106 are co-propagating, and "backward" as the counter-propagating direction.

The interaction Hamiltonian categorized to the forward and backward direction can be expressed as:

$$H_{int} = \hbar(\beta_f \hat{a}_1 \hat{a}_2^\dagger \hat{b} + \beta_f^* \hat{a}_1^\dagger \hat{a}_2 \hat{b}^\dagger) + \hbar(\beta_b \hat{a}_1 \hat{a}_2^\dagger \hat{b}^\dagger + \beta_b^* \hat{a}_1^\dagger \hat{a}_2 \hat{b}) \quad (3)$$

where $\beta_f = \beta \delta(k_1 - k_2 + q)$ and $\beta_b = \beta \delta(-k_1 + k_2 + q)$ are the optomechanical coupling coefficients including the phase matching conditions in the forward and backward directions respectively. Here, $\delta(\ )$ is the Kronecker delta function, $\hat{a}_1^\dagger(\hat{a}_1)$ and $\hat{a}_2^\dagger(\hat{a}_2)$ are the creation (annihilation) operators for the $TE_{10}$ and $TE_{00}$ modes respectively, and $\hat{b}^\dagger(\hat{b})$ is for the acoustic pump.

In addition, the RF-electromechanically driven acoustic field ($s_{RF}$) is included. The input acoustic field can be determined as $|s_{RF}|^2 = \eta_a P_{RF}/\hbar\Omega$ where $P_{RF}$ is the RF driving power, where $\Omega$ is the RF driving frequency, $\eta_a$ is the electromechanical coupling, and $\Gamma$ is the mechanical loss rate. An externally provided laser ($s_{in}$) is coupled to the $TE_{10}$ and $TE_{00}$ modes through the external coupling rates $k_{ex1}$ and $k_{ex2}$. As above, the input optical field is determined as $|s_{in}|^2 = P_{in}/\hbar\omega_l$ where $P_{in}$ is the input laser power and $\omega_l$ is the frequency of carrier laser. Therefore, the total effective Hamiltonian for the system 100 can be written as (4):

$$H_{eff} = \hbar\omega_1 \hat{a}_1^\dagger \hat{a}_1 + \hbar\omega_2 \hat{a}_2^\dagger \hat{a}_2 + \hbar\omega_m \hat{b}^\dagger \hat{b} + \hbar(\beta_f \hat{a}_1 \hat{a}_2^\dagger \hat{b} + \beta_f^* \hat{a}_1^\dagger \hat{a}_2 \hat{b}^\dagger) + \\ \hbar(\beta_b \hat{a}_1 \hat{a}_2^\dagger \hat{b}^\dagger + \beta_b^* \hat{a}_1^\dagger \hat{a}_2 \hat{b}) + i\hbar\sqrt{\kappa_{ex1}}(\hat{a}_1^\dagger s_{in} e^{-i\omega_l t} - \hat{a}_1 s_{in}^* e^{i\omega_l t}) + \\ i\hbar\sqrt{\kappa_{ex2}}(\hat{a}_2^\dagger s_{in} e^{-i\omega_l t} - \hat{a}_2 s_{in}^* e^{i\omega_l t}) + i\hbar\sqrt{\Gamma}(\hat{b}^\dagger s_{RF} e^{-i\Omega t} - \hat{b} s_{RF}^* e^{i\Omega t}) \quad (4)$$

Working in a frame rotating with the RF driving frequency ($\Omega$), the equations of motion for the mechanical and optical modes by means of Heisenberg-Langevin equation are written as:

$$\dot{\hat{b}} = -i(\omega_{in} - \Omega)\hat{b} - \frac{\Gamma}{2}\hat{b} - i\beta_f^* \hat{a}_1^\dagger \hat{a}_2 e^{i\Omega t} - i\beta_b \hat{a}_1 \hat{a}_2^\dagger e^{i\Omega t} + \sqrt{\Gamma} s_{RF} \quad (5a)$$

$$\dot{\hat{a}}_1 = -i\omega_1 \hat{a}_1 - \frac{\kappa_1}{2}\hat{a}_1 - i\beta_f^* \hat{a}_2 \hat{b}^\dagger e^{i\Omega t} - i\beta_b^* \hat{a}_2 \hat{b} e^{-i\Omega t} + \sqrt{\kappa_{ex1}} s_{in} e^{-i\omega_l t} \quad (5b)$$

$$\dot{\hat{a}}_2 = -i\omega_2 \hat{a}_2 - \frac{\kappa_2}{2}\hat{a}_2 - i\beta_f \hat{a}_1 \hat{b} e^{-i\Omega t} - i\beta_b \hat{a}_1 \hat{b}^\dagger e^{i\Omega t} + \sqrt{\kappa_{ex2}} s_{in} e^{-i\omega_l t} \quad (5c)$$

where $k_1$ ($k_2$) are the optical loss rates of the $TE_{10}$ ($TE_{00}$) modes.

The above general equations can be distilled for two specific cases in which light enters from the forward and backward directions.

Scattering process in the forward direction (co-propagating direction).

The equations of motion in Eq. (5) are treated classically by making substitutions as follows: $\hat{a}_1, (\hat{a}_2) \to a_1(a_2)$ and $\hat{b} \to u$. Thus $a_1$ and $a_2$ are the amplitudes of the $TE_{10}$ and $TE_{00}$ intracavity fields respectively and u is the steady state amplitude of the acoustic field under the non-depleted RF pump approximation. The situation illustrated in FIG. 7 is considered, where phase matching only occurs for forward propagating light ($k_1 - k_2 + q = 0$). Here, the non-phase matched terms can be neglected, e.g. the term with $\beta_b$ in Eq. 5. $\delta(\ )$ can also be dropped in the forward intermodal coupling coefficient and simply use $\beta$ as the optomechanical coupling rate. The $TE_{10}$ mode can only convert into the $TE_{00}$ mode through anti-Stokes scattering. Similarly, the $TE_{00}$ mode can only convert into the $TE_{10}$ mode through Stokes scattering. Thus, Eq. 5 can be rewritten as:

$$\dot{a}_1 = -\frac{\kappa_1}{2}a_1 - i\omega_1 a_1 - i\beta^* u^* a_2 e^{i\Omega t} + \sqrt{\kappa_{ex1}} s_{in} e^{-i\omega_l t} \quad (6a)$$

$$\dot{a}_2 = -\frac{\kappa_2}{2}a_2 - i\omega_2 a_2 - i\beta u a_1 e^{-i\Omega t} + \sqrt{\kappa_{ex2}} s_{in} e^{-i\omega_l t} \quad (6b)$$

The mode amplitudes $a_1$ and $a_2$ can be expressed through Fourier decomposition of the sidebands created by the intermodal scattering:

$$a_1 = \sum_{n=-\infty}^{\infty} a_{1,n} e^{-i(\omega_l + n\Omega)t} = a_{1,-1} e^{-i(\omega_l - \Omega)t} + a_{1,0} e^{-i\omega_l t} \quad (7a)$$

$$a_2 = \sum_{n=-\infty}^{\infty} a_{2,n} e^{-i(\omega_l + n\Omega)t} = a_{2,0} e^{-i\omega_l t} + a_{2,+1} e^{-i(\omega_l + \Omega)t} \quad (7b)$$

where n indicates the sideband order. The following convention is adopted: $a_{i,0}$ is the intracavity field at the carrier frequency, while $a_{i,-1}$ ($a_{i,+1}$) are the intracavity fields at the Stokes (anti-Stokes) shifted frequency for the ith order mode. Thus, $a_{1,0}$ ($a_{2,0}$) are the intracavity field amplitude for $TE_{10}$ ($TE_{00}$) mode at the carrier frequency e.g. the frequency of the source laser. $a_{1,-1}$ is the Stokes sideband amplitude for the $TE_{10}$ mode. $a_{2,+1}$ is the anti-Stokes sideband amplitude for the $TE_{00}$ mode. The remaining sidebands are suppressed due to the phase matching condition, e.g. absence of suitable optical modes.

The intracavity field amplitudes $a_{1,0}$, $a_{2,0}$, $a_{1,-1}$ and $a_{2,+1}$ are obtained by substituting Eq. (7) to Eq. (6).

$$a_{1,0} = \frac{\sqrt{\kappa_{ex1}} s_{in} - i\beta^* u^* a_{2,+1}}{\kappa_1/2 - i\Delta_1} \text{ and} \quad (8)$$

$$a_{2,0} = \frac{\sqrt{\kappa_{ex2}} s_{in} - i\beta u a_{1,-1}}{\kappa_2/2 - i\Delta_2}$$

$$a_{1,-1} = \frac{-i\beta^* u^* a_{2,0}}{\kappa_1/2 - i(\Delta_1 - \Omega)} \text{ and}$$

$$a_{2,+1} = \frac{-i\beta u a_{1,0}}{\kappa_2/2 - i(\Delta_2 + \Omega)}$$

where the optical detunings are $\Delta_1 = \omega_l - \omega_1$ and $\Delta_2 = \omega_l - \omega_2$.

In the solutions for the carrier frequency components ($a_{1,0}$ and $a_{2,0}$), the first term in the numerator is the input field coupled from the optical waveguide 200 and the second term is the field scattered back from the corresponding sideband. The sideband intracavity fields can be finally expressed in terms of the input laser ($s_{in}$) as follows:

$$a_{1,0} = \frac{\sqrt{\kappa_{ex1}}(\kappa_2/2 - i(\Delta_2 + \Omega))}{(\kappa_2/2 - i(\Delta_2 + \Omega))(\kappa_1/2 - i\Delta_1) + |\beta|^2|u|^2} s_{in}, \quad (9a)$$

$$a_{2,0} = \frac{\sqrt{\kappa_{ex2}}(\kappa_1/2 - i(\Delta_1 + \Omega))}{(\kappa_1/2 - i(\Delta_1 - \Omega))(\kappa_2/2 - i\Delta_2) + |\beta|^2|u|^2} s_{in}, \quad (9b)$$

$$a_{1,-1} = \frac{-i\beta^* u^* \sqrt{\kappa_{ex2}}}{(\kappa_1/2 - i(\Delta_1 + \Omega))(\kappa_2/2 - i\Delta_2) + |\beta|^2|u|^2} s_{in}, \quad (9c)$$

$$a_{2,+1} = \frac{-i\beta u \sqrt{\kappa_{ex1}}}{(\kappa_2/2 - i(\Delta_2 + \Omega))(\kappa_1/2 - i\Delta_1) + |\beta|^2|u|^2} s_{in}. \quad (9d)$$

When the optomechanical coupling rate is much smaller than the optical loss rate ($|\beta||u| \ll$ square root of $k_1 k_2/2$), e.g., for small acoustic drive (u), Eq. 8 can be simplified to:

$$a_{1,0} = \frac{\sqrt{\kappa_{ex1}}}{\kappa_1/2 - i\Delta_1} s_{in}, \quad (10a)$$

$$a_{2,0} = \frac{\sqrt{\kappa_{ex2}}}{\kappa_2/2 - i\Delta_2} s_{in}, \quad (10b)$$

$$a_{1,-1} = \frac{-i\beta^* u^* \sqrt{\kappa_{ex2}}}{(\kappa_1/2 - i(\Delta_1 - \Omega))(\kappa_2/2 - i\Delta_2)} s_{in}, \quad (10c)$$

$$a_{2,+1} = \frac{-i\beta u \sqrt{\kappa_{ex1}}}{(\kappa_2/2 - i(\Delta_2 + \Omega))(\kappa_1/2 - i\Delta_1)} s_{in} \quad (10d)$$

By means of input output theorem, the expression for the output spectrum ($s_{out}$) is obtained from the waveguide containing carrier ($s_{out,0}$), Stokes ($s_{out,-1}$), and anti-Stokes ($s_{out,+1}$) frequency components:

$$s_{out} = s_{out,0} + s_{out,+1} e^{-i\Omega t} + s_{out,-1} e^{i\Omega t} \quad (11)$$

Where $$s_{out,0} = s_{in} - \sqrt{\kappa_{ex1}} a_{1,0} - \sqrt{\kappa_{ex2}} a_{2,0} \quad (12a)$$

$$s_{out,-1} = -\sqrt{\kappa_{ex1}} a_{1,-1} \quad (12b)$$

$$s_{out,+1} = -\sqrt{\kappa_{ex2}} a_{2,+1} \quad (12c)$$

These equations are used to plot the example curves in FIG. 5.

Scattering Process in the Backward Direction (Counter-propagating Direction)

The case shown in FIG. 8 where the light propagating direction is in the backward direction is considered. Due to the backward phase matching condition ($-k_1 + k_2 + q = 0$), as opposed to the scattering in the forward direction, the $TE_{10}$ ($TE_{00}$) modes can only convert into the $TE_{00}$ ($TE_{10}$) modes through Stokes (anti-Stokes) scattering. When the resonance frequency of the $TE_{10}$ mode is higher than the $TE_{00}$ mode, the phase matching condition is satisfied in the backward direction. Thus, in this case, the equations of motion in Eq. 5 are simplified to:

$$\dot{a}_1 = -\frac{\kappa_1}{2} a_1 - i\omega_1 a_1 - i\beta^* u a_2 e^{-i\Omega t} + \sqrt{\kappa_{ex1}} s_{in} e^{-i\omega_l t} \quad (13a)$$

$$\dot{a}_2 = -\frac{\kappa_2}{2} a_2 - i\omega_2 a_2 - i\beta u^* a_1 e^{i\Omega t} + \sqrt{\kappa_{ex2}} s_{in} e^{-i\omega_l t} \quad (13b)$$

The composited amplitudes $a_1$ and $a_2$ can be written as:

$$a_1 = a_{1,0} e^{-i\omega_l t} + a_{1,+1} e^{-i(\omega_l + \Omega)t} \quad (14a)$$

$$a_2 = a_{2,-1} e^{-i(\omega_l - \Omega)t} + a_{2,-1} e^{-i\omega_l t} \quad (14b)$$

where $a_{1,+1}$ is the anti-Stokes sideband amplitude in the $TE_{10}$ mode, and $a_{2,-1}$ is the Stokes sideband amplitude in the $TE_{00}$ mode.

$$a_{1,0} = \frac{\sqrt{\kappa_{ex1}} s_{in} - i\beta^* u a_{2,-1}}{\kappa_1/2 - i\Delta_1} \text{ and} \quad (15)$$

$$a_{2,0} = \frac{\sqrt{\kappa_{ex2}} s_{in} - i\beta u^* a_{1,+1}}{\kappa_2/2 - i\Delta_2}$$

$$a_{1,+1} = \frac{-i\beta^* u a_{2,0}}{\kappa_1/2 - i(\Delta_1 + \Omega)} \text{ and}$$

$$a_{2,-1} = \frac{-i\beta u^* a_{1,0}}{\kappa_2/2 - i(\Delta_2 - \Omega)}$$

The sideband intracavity fields can be expressed in terms of the input laser ($s_{in}$) as follows:

$$a_{1,0} = \frac{\sqrt{\kappa_{ex1}} \, (\kappa_2/2 - i(\Delta_2 - \Omega))}{(\kappa_2/2 - i(\Delta_2 - \Omega))(\kappa_1/2 - i\Delta_1) + |\beta|^2|u|^2} s_{in}, \quad (16a)$$

$$a_{2,0} = \frac{\sqrt{\kappa_{ex2}} \, (\kappa_1/2 - i(\Delta_1 + \Omega))}{(\kappa_1/2 - i(\Delta_1 + \Omega))(\kappa_2/2 - i\Delta_2) + |\beta|^2|u|^2} s_{in}, \quad (16b)$$

$$a_{1,+1} = \frac{-i\beta^* u \sqrt{\kappa_{ex2}}}{(\kappa_1/2 - i(\Delta_1 + \Omega))(\kappa_2/2 - i\Delta_2) + |\beta|^2|u|^2} s_{in}, \quad (16c)$$

$$a_{2,-1} = \frac{-i\beta u^* \sqrt{\kappa_{ex1}}}{(\kappa_2/2 - i(\Delta_2 - \Omega))(\kappa_1/2 - i\Delta_1) + |\beta|^2|u|^2} s_{in}. \quad (16d)$$

When the optomechanical coupling rate is much smaller than the optical loss rate ($|\beta||u| \ll \sqrt{\kappa_1\kappa_2}/2$), e.g. for small acoustic drive (u), Eq. 15 can be simplified to:

$$a_{1,0} = \frac{\sqrt{\kappa_{ex1}}}{\kappa_1/2 - i\Delta_1} s_{in}, \quad (17a)$$

$$a_{2,0} = \frac{\sqrt{\kappa_{ex2}}}{\kappa_2/2 - i\Delta_2} s_{in}, \quad (17b)$$

$$a_{1,+1} = \frac{-i\beta^* u \sqrt{\kappa_{ex2}}}{(\kappa_1/2 - i(\Delta_1 + \Omega))(\kappa_2/2 - i\Delta_2)} s_{in}, \quad (17c)$$

$$a_{2,-1} = \frac{-i\beta u^* \sqrt{\kappa_{ex1}}}{(\kappa_2/2 - i(\Delta_2 - \Omega))(\kappa_1/2 - i\Delta_1)} s_{in} \quad (17d)$$

Similar to the output from the previous section, the output spectrum ($s_{out}$) from the waveguide 200 contains the carrier ($s_{out,0}$), Stokes ($s_{out,-1}$), and anti-Stokes ($s_{out,+1}$) frequency components:

$$s_{out} = s_{out,0} + s_{out,+1} e^{-i\Omega t} + s_{out,-1} e^{i\Omega t} \quad (18)$$

where $$s_{out,0} = s_{in} - \sqrt{\kappa_{ex1}} a_{1,0} - \sqrt{\kappa_{ex2}} a_{2,0} \quad (19a)$$

$$s_{out,-1} = -\sqrt{\kappa_{ex2}} a_{2,-1} \quad (19b)$$

$$s_{out,+1} = -\sqrt{\kappa_{ex1}} a_{1,+1} \quad (19c)$$

These equations are used to plot the example curves in FIG. 5.

Measurement of Optical Spectra

Figure 9:
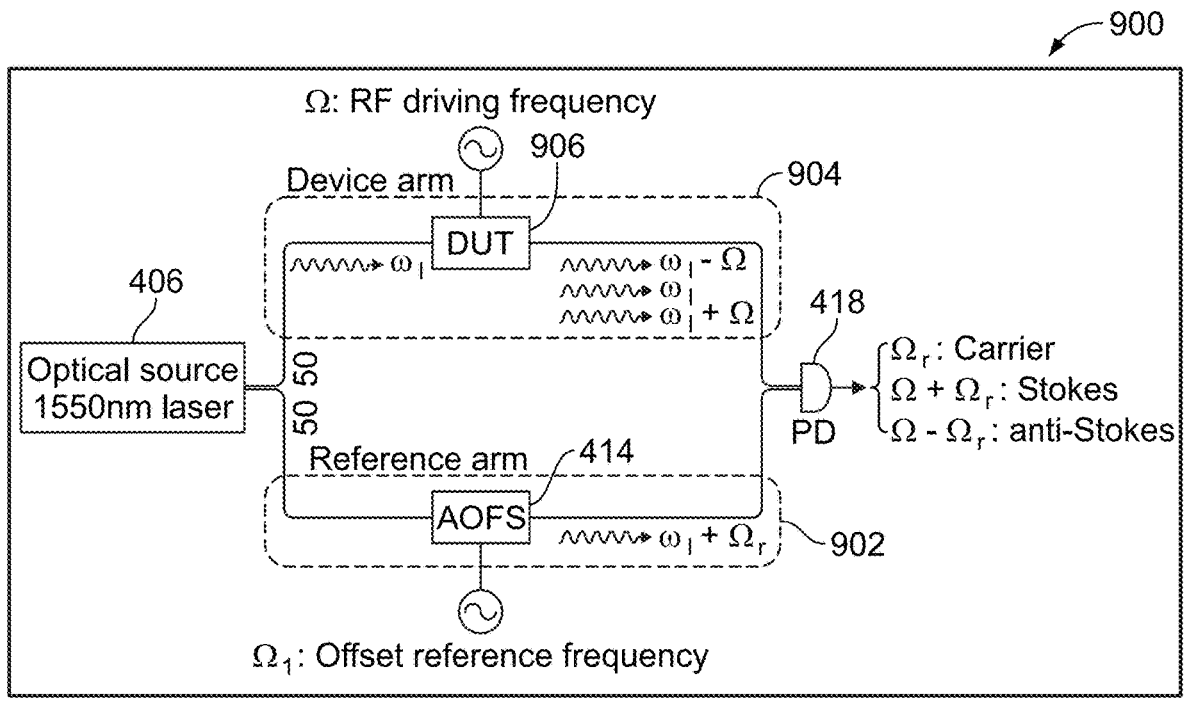
FIG. 9 is a block diagram of an example measurement setup utilizing optical heterodyne detection.

FIG. 9 is a block diagram of an example measurement setup 900 utilizing optical heterodyne detection. The light from the optical source 406 is split into the reference arm 902 and the device arm 904. The frequency of the light in the reference arm 902 is shifted by the AOFS 414 by a determined offset $\Omega_r$. The beat notes of the frequency shifted reference with the carrier, Stokes, and anti-Stokes from the device under test (DUT) 906 are measured by the photodetector 418 and have frequency components $\Omega_r$, $\Omega + \Omega_r$, and $\Omega - \Omega_r$ respectively. In order to measure the amplitude of the Stokes and anti-Stokes sidebands separately, optical heterodyne detection can be utilized with the assistance of an acousto-optic frequency shifter (AOFS).

Considering the frequency up-shifted reference signal ($s_r e^{-i\Omega_r t}$) generated from the AOFS 141 in the reference arm 902, the optical output spectrum at the photodetector 418 can be expressed as:

$$s_{out} = s_{out,0} + s_{out,+1} e^{-i\Omega t} + s_{out,-1} e^{i\Omega t} + s_r e^{-i\Omega_r t} \quad (20)$$

The resulting electronic signals from the photodetector 418 are beat notes of the optical reference signal with the carrier, Stokes, and anti-Stokes signals, and occur at $\Omega_r$, $\Omega + \Omega_r$, and $\Omega - \Omega_r$ respectively. The powers of each frequency component can be independently measured using an electronic spectrum analyzer. Solving Eq. (20) for each frequency component while considering the photodetector gain, the RF outputs can be expressed as:

$$P_{C,\Omega_r} = g_{pd} |s_r|^2 |s_{out,0}|^2$$

$$P_{S,\Omega+\Omega_r} = g_{pd} |s_r|^2 |s_{out,-1}|^2$$

$$P_{AS,\Omega-\Omega_r} = g_{pd} |s_r|^2 |s_{out,+1}|^2 \quad (21)$$

where $P_{C,\Omega_r}$, $P_{S,\Omega+\Omega_r}$, and $P_{AS,\Omega-\Omega_r}$ are the carrier, Stokes, and anti-Stokes RF power outputs from the photodetector, respectively. Here, $g_{pd}$ is the lumped proportionality constant including photodetector gain.

Since the acousto-optic scattering process is linearly proportional to the input light power, the optical power from the output waveguide normalizes to the input light power:

$$P_{in} = g_{pd} |s_r|^2 |s_{in}|^2$$

Dividing the measured power by the input power, the normalized power coefficients are given by:

$$\bar{P}_{C,\Omega_r} = \left|\frac{s_{out,0}}{s_{in}}\right|^2 \quad (22)$$

$$\bar{P}_{S,\Omega+\Omega_r} = \left|\frac{s_{out,-1}}{s_{in}}\right|^2$$

$$\bar{P}_{AS,\Omega-\Omega_r} = \left|\frac{s_{out,+1}}{s_{in}}\right|^2$$

These coefficients can be used to quantify the performance of this mode converting modulator.

Example Limit of Sideband Amplitude

The maximum sideband amplitude achievable in the system 100 can be quantified. The intracavity Stokes sideband field amplitude for the $TE_{10}$ mode is shown in Eq. 12b. The phonon enhanced optomechanical coupling rate $G_{ph} = \beta u$ is introduced. The Stokes sideband from the waveguide 200 $s_{out,-1}$ is:

$$s_{out,-1} = \sqrt{\kappa_{ex1}} \left( \frac{-i G_{ph}^* \sqrt{\kappa_{ex2}}}{(\kappa_1/2 - i(\Delta_1 - \Omega))(\kappa_2/2 - i\Delta_2) + |G_{ph}|^2} \right) s_{in} \quad (23)$$

From the above equation, it can be seen that the sideband amplitude is maximized when the frequency matching between the modes is perfect ($\omega_1 - \omega_2 + \Omega = 0$) and the carrier is located on the resonance of the $TE_{00}$ mode. As a result, the imaginary parts in the denominator vanish and the equation can be simplified to:

$$s_{out,-1} = \frac{-i G_{ph}^* \sqrt{\kappa_{ex1} \kappa_{ex2}}}{\kappa_1 \kappa_2 / 4 + |G_{ph}|^2} s_{in} \quad (24)$$

To investigate the example limit of sideband amplitude with respect to phonon-enhanced optomechanical coupling $G_{ph}$, the maximum point where $G_{ph}$ satisfies $$\frac{\partial s_{out,-1}}{\partial G} = 0$$

is calculated, which is:

$$G_{ph} = \frac{\sqrt{\kappa_1 \kappa_2}}{2} \quad (25)$$

At this pump level, the calculated maximum sideband field amplitude becomes:

$$S_{out,-1|max} = \sqrt{\frac{\kappa_{ex1}\kappa_{ex2}}{\kappa_1 \kappa_1}} \, S_{in} \quad (26)$$

This is the point where the photon energy exchange between the two optical modes $a_1$ and $a_2$ is in equilibrium. From the equation, it can be seen that if there is no intrinsic photon loss in the resonator, which means that the external couplings are only photon loss mechanism ($k_{ex1}=k_1$, $k_{ex2}=k_2$), 100% of light can be transferred to the sideband. In case where both optical modes are critically coupled to the waveguide 200 ($k_{ex1}=k_1/2$, $k_{ex2}=k_2/2$), the maximum sideband amplitude is 25% of carrier power (50% of carrier field). The rest of power is dissipated in the resonator 104. If the acoustic pump 106 increases beyond this point, the optical modes split, e.g., the system 100 enters the strong coupling regime.

Optomechanical Coupling Coefficient

In order to quantify the intermodal optomechanical coupling coefficient (β) from the experimental data, the model used in H. Li, S. A. Tadesse, Q. Liu, and M. Li, "Nanophotonic cavity optomechanics with propagating acoustic waves at frequencies up to 12 GHz," Optica, vol. 2, no. 9, pp. 826-831, 2015, can be employed. From the fitting of experimental data shown in FIG. 5A, $G_{ph}=|β||u|=0.0589$ GHz is obtained when 0 dBm of RF input power is supplied. Since, |β| and |u| cannot be independently determined from the fitting model, the displacement u associated with the acoustic wave is estimated with the assistance of finite element simulation (COMSOL). The displacement associated with the acoustic pump for a given RF power is calculated using:

$$u = \sqrt{\frac{2\pi \eta_a P_{RF}}{\gamma W \Omega}} \quad (27)$$

where W is the IDT aperture, and γ is the proportionality factor relating $u^2$ and acoustic energy, $$\gamma = \frac{1}{Wu^2} \int_{x,y,z=0}^{x,y,z=\Lambda,W,\infty} U(x,y,z)dxdydz$$

Λ is the wavelength of acoustic pump, and U is the total mechanical energy density of mechanical mode.

Figure 10:
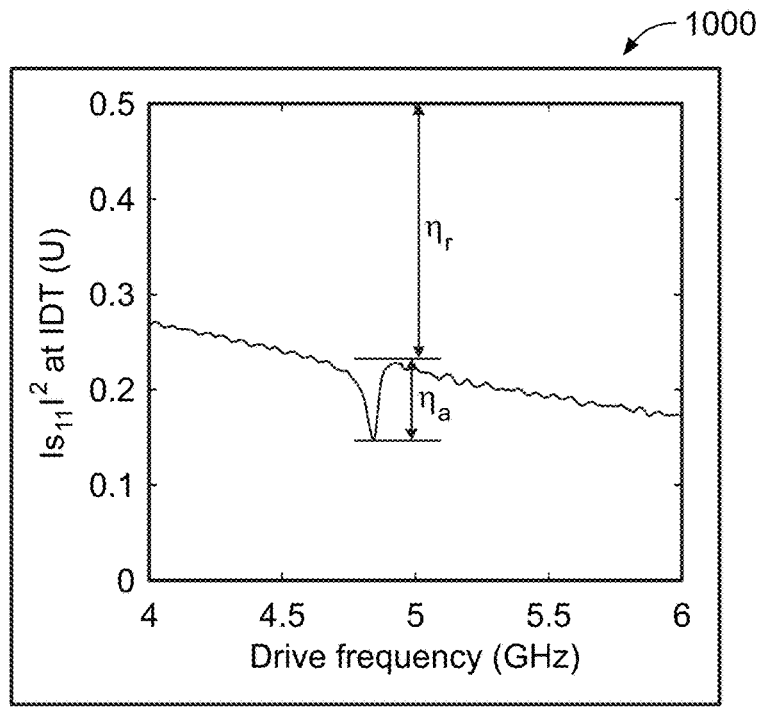
FIG. 10 is a graph of an example reflection ($s_{11}$) measurement at IDT using a calibrated vector network analyzer (VNA).

FIG. 10 is a graph 1000 of an example reflection ($s_{11}$) measurement at IDT 202, e.g., using a calibrated vector network analyzer (VNA). The $S_0$ Lamb acoustic wave is efficiently actuated at 4.82 GHz leading to a reduction in the $s_{11}$ parameter (reflection). The RF power transferred to the acoustic pump power is calculated using the $s_{11}$ parameter measurement with an electronic VNA. In the example of FIG. 10, $\eta_a=3.9\%$, implying that 3.9% of the RF power is transferred to the acoustic power, where $\eta_a$ is the efficiency of conversion of electrical power to acoustic power and $\eta_r$ is the power loss at the IDT through parasitic capacitance. γ of the $S_0$ acoustic mode generated by the IDTs is calculated using FEM simulation (=2.55×10$^{11}$J/m$^3$). From the fitting of FIG. 5A, the calculated β is found to be 0.204 GHz/nm.

The calculated optomechanical coupling coefficient β quantifies how efficiently the acoustic wave can couple the two optical modes. The estimated displacement u in the above model is the acoustic response of the IDT 202, which is not the actual amplitude of the acoustic pump traveling in the waveguide 200. There can exist multiple sources of loss such as intrinsic acoustic loss of the material or reflections from the waveguide ridge 206 that do not permit a better estimate.

Producing an Optical Isolator.

Figure 11:
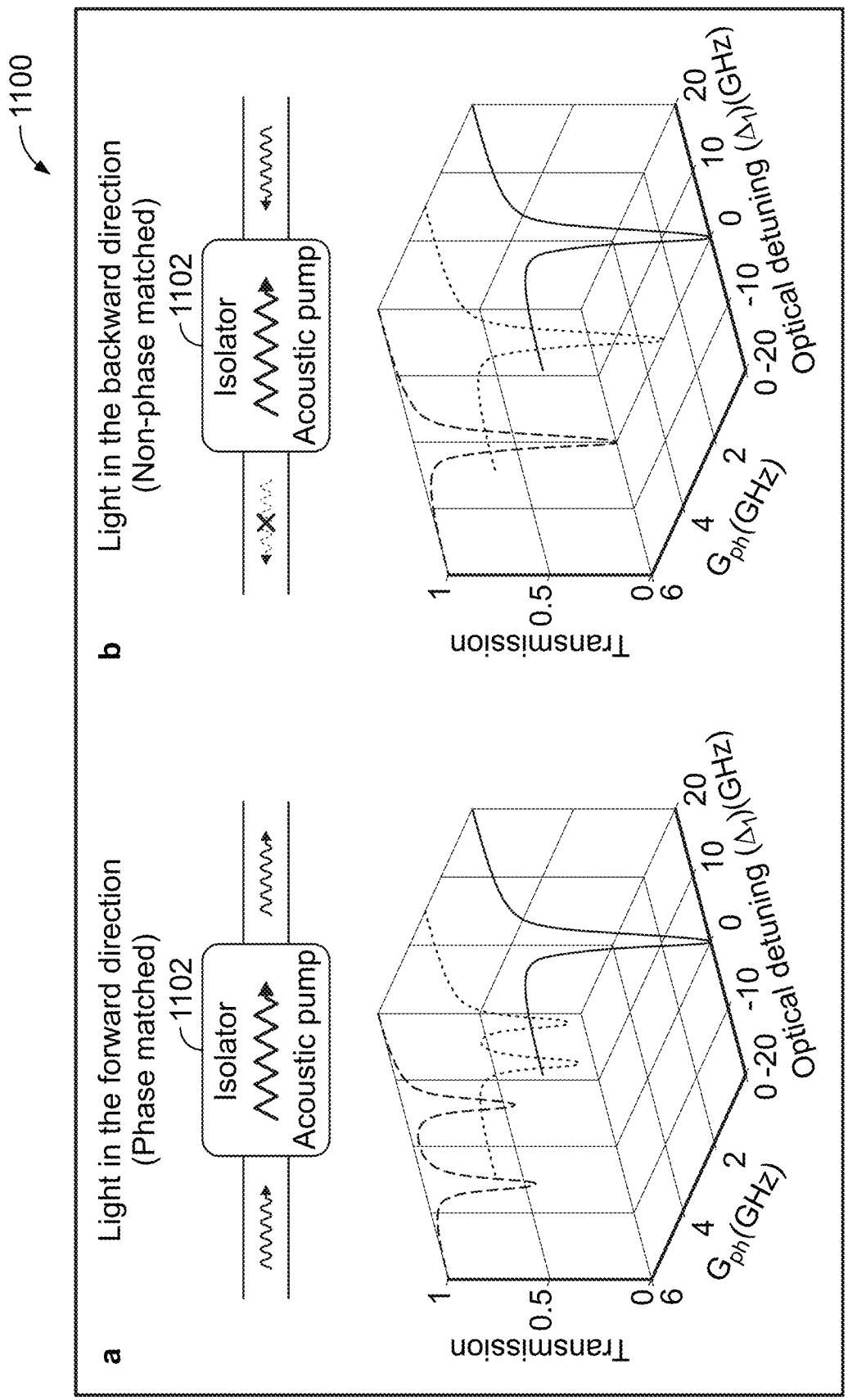
FIG. 11 illustrates schematics and graphs of an example optical isolator and 3D plot of light transmission spectrum respect to optomechanical coupling rate ($G_{ph}$) and $TE_{10}$ detuning ($\Delta_1$).

FIG. 11 illustrates graphs 1100 of an example schematic of the optical isolator 1102 and 3D plot of light transmission spectrum with respect to optomechanical coupling rate ($G_{ph}$) and $TE_{10}$ detuning ($\Delta_1$). In graph (a) the forward direction (phase matched direction), the optical mode is split and the transmission approaches 100% on resonance ($\Delta_1=0$) for large optomechanical coupling. In graph (b) the backward direction (non-phase matched direction) the optical mode shape remains the same so that light is absorbed by the resonator 104. The optical isolator 1102 that blocks light in one direction but allows light transmission in the other direction is an example of a non-reciprocal device. An example model is described to build a magnetless optical isolator by changing few design parameters of the current system 100.

The transmission spectrum of the $TE_{10}$ mode in the forward phase matched case (Eq. 18) is described. It is assumed that the mechanical driving frequency and the frequency separation between the two optical modes are the same ($\omega_2-\omega_1=\Omega$) so that the intermodal scattering can most efficiently take place. It is also assumed that the sideband is in the fully resolved regime ($\Omega \gg k_1/2$ and $k_2/2$). The power transmission from the waveguide 102 in the forward direction can be expressed as:

$$|s_{out}|^2 = |s_{in} - \sqrt{\kappa_{ex1}}a_{1,0} + \sqrt{\kappa_{ex2}}a_{2,+1}e^{-i\Omega t}|^2 \quad (28)$$

It is noted that $a_{2,0}$ and $a_{1,-1}$ terms approach zero when $\Delta_1 \ll \omega_2-\omega_1$. The $TE_{10}$ mode is coupled to the I/O waveguide 102 ($k_{ex1}=k_1/2=1$ GHz) so that there is no transmission through the I/O waveguide 102. It is also assumed that the optical loss rate of $TE_{00}$ ($k_2$) is 1 GHz. Using this equation, the forward and backward transmission spectrum (FIG. 11) is plotted with respect to the optical detuning of the laser from the $TE_{10}$ mode ($\Delta_1$). Without optomechanical coupling ($G_{ph}=0$), the backward and forward transmissions exhibit identical Lorentzian shape transmission absorbing all the light on the resonance of the $TE_{10}$ mode ($\Delta_1=0$) as shown in FIG. 11. When the optomechanical coupling enters the strong coupling regime ($G_{ph}$>the square root of $k_1k_2/2$), the $TE_{10}$ resonance mode begins to split (FIG. 11, graph a). With sufficient acoustic power, the system 100 becomes completely transparent at zero detuning only in the forward direction. In the backward direction, where the phase matching condition is not satisfied, the $TE_{10}$ resonance mode remains the same (FIG. 11, graph b) so that all the light is absorbed by the resonator 104.

Producing Acousto-optic Frequency Shifter (AOFS)

Figure 12:
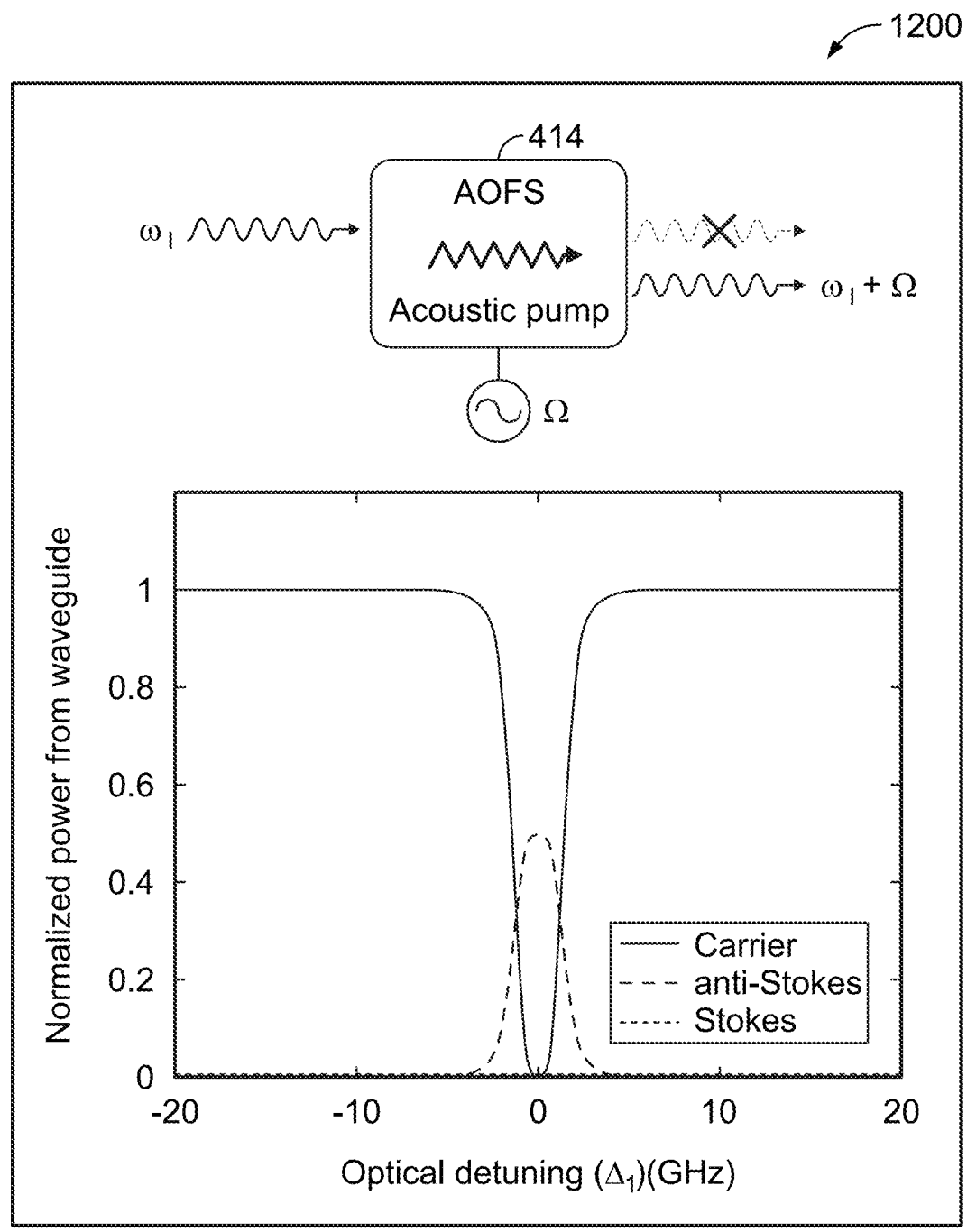
FIG. 12 illustrates a schematic and a graph of an example AOFS simulated based on the non-reciprocal modulator model.

FIG. 12 illustrates a schematic and a graph 1200 of an example AOFS 414 simulated based on the non-reciprocal modulator model. In some examples, the carrier transmission is suppressed on resonance and 50% of power is converted into the anti-Stokes sideband. For an ideal AOFS

414, an attenuated carrier transmission is desired so that the output of the device is only the frequency shifted light. An example of a chip-scale acousto-optic frequency shifter (AOFS) using the current system 100 is described.

The transmission spectrum of $TE_{10}$ mode ($\Delta_t \ll \omega_2 - \omega_1$) in the forward phase matched case is considered. It is assumed that the two optical modes are fully resolved ($\omega_2 - \omega_1 > k_1/2$ and $k_1/2$). The output from the I/O waveguide 102 can be expressed as:

$$|s_{out}|^2 = |s_{in} - \sqrt{\kappa_{ex1}} a_{1,0} + \sqrt{\kappa_{ex2}} a_{2,+1} e^{-i\Omega t}|^2 \quad (29)$$

From Eq. 9a, it is found that the transmission of the carrier laser vanishes ($s_{in} - \sqrt{\kappa_{ex1}} a_{1,0} = 0$), when the following equation is satisfied.

$$|G_{ph}|^2 = \frac{\kappa_2}{2}\left(\kappa_{ex1} - \frac{\kappa_1}{2}\right) \quad (30)$$

Therefore, the output from the waveguide is only an anti-Stokes sideband, which can be represented as:

$$|s_{out}|^2 = \left|\frac{-iG_{ph}\sqrt{\kappa_{ex1}\kappa_{ex2}}}{(\kappa_2/2 - i(\Delta_2 + \Omega))(\kappa_1/2 - i\Delta_1) + |G_{ph}|^2} s_{in} e^{-i\Omega t}\right|^2 \quad (31)$$

Figure 13:
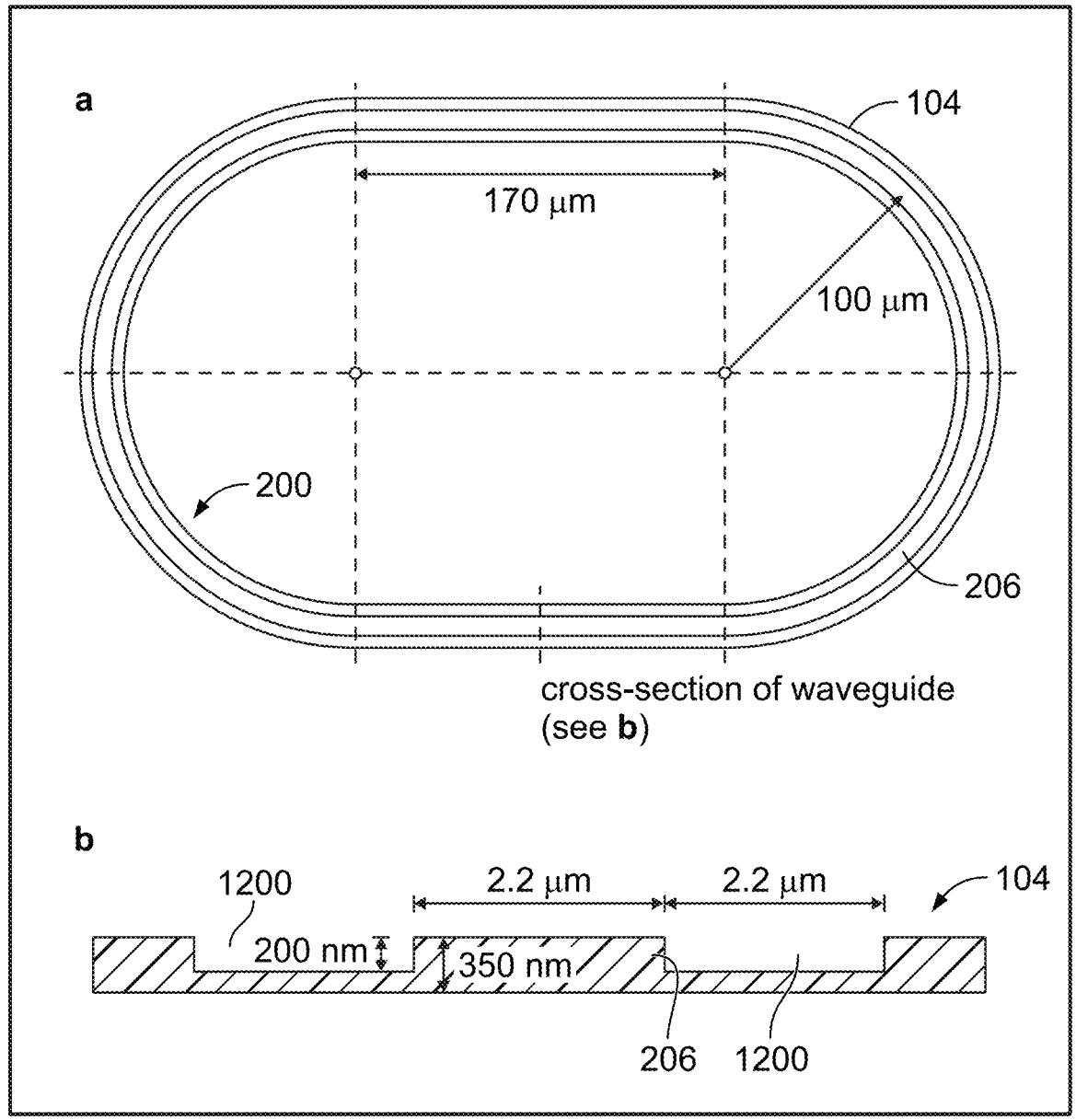
FIG. 13 is a schematic of an example resonator that can support two optical modes.

From Eq. 30, it can be seen that the carrier transmission can be fully suppressed for certain optomechanical coupling coefficient ($G_{ph}$) such that the resonator is over-coupled to the waveguide ($k_{ex1} > k_1/2$). In other words, when the combined photon loss rate induced by the scattering process and the intrinsic loss is the same as the external coupling rate, the optical mode is critically coupled to the I/O waveguide 102. Based on the above equations, output spectrum of the $TE_{10}$ mode from the I/O waveguide 102 is calculated. In the example, it is assumed that $k_{ex1} = k_{ex2} = 1.5$ GHz and $k_1 = k_2 = 2$ GHz. In FIG. 13, when the acoustic power satisfying Eq. 30 is applied to the system 100, the carrier is fully absorbed by the resonator and only the anti-Stokes light comes out from the waveguide.

Racetrack Resonator Dimensions

FIG. 13 is a schematic of an example resonator 104 that can support two optical modes. In some examples, the resonator 104 can include a 2.2 μm width waveguide, having 170 μm linear regions and 100 μm radius curved regions. The total circumference of the example resonator 104 is 968 μm. The resonator 104 can be fabricated on 350 nm of AlN on silicon substrate, which is undercut to confine light and the $S_0$ Lamb acoustic wave in AlN only. In some examples, the ridge 206 for the resonator 104 includes 200 nm deep etches 1200 on either side. This leaves behind 150 nm of AlN such that the resonator 104 is mechanically supported by the rest of the substrate and is acoustically linked to it.

We claim:

1. A system, comprising:
   a resonator;
   a waveguide coupled with the resonator for guiding light to the resonator;
   a radio frequency drive coupled to the resonator, the radio frequency drive configured to form an acoustic pump of the resonator for breaking time-reversal symmetry for light propagation; and
   a reflector to reflect phonons travelling from the acoustic pump back to the resonator.

2. The system of claim 1, further comprising an interdigitated transducer connected with the radio frequency drive, where the radio frequency drive powers the interdigitated transducer to form the acoustic pump.

3. The system of claim 2, where the interdigitated transducer and the resonator form a phonon-phonon interaction region on the resonator.

4. The system of claim 2, where the interdigitated transducer is provided at an oblique angle in relation to the resonator.

5. The system of claim 1, further comprising grating couplers allowing light to be coupled into the waveguide.

6. The system of claim 1, where the acoustic pump simultaneously breaks orthogonality between optical modes of the resonator while also satisfying a phase matching condition.

7. The system of claim 6, where the acoustic pump comprises a two dimensional acoustic wave.

8. The system of claim 1, where the resonator includes a waveguide including a ridge.

9. The system of claim 1, where the resonator includes a racetrack shape having two straight sections connected with two curved sections.

10. A method, comprising:
    guiding light to a resonator;
    driving a radio frequency signal to the resonator to form an acoustic pump of the resonator to break time-reversal symmetry for light propagation; and
    reflecting phonons back to the resonator.

11. The method of claim 10, further comprising forming a phonon-phonon interaction region of the resonator.

12. The method of claim 10, providing an interdigitated transducer at an oblique angle in relation to the resonator to drive the acoustic pump to the resonator.

13. The method of claim 12, further comprising powering the interdigitated transducer to form the acoustic pump.

14. The method of claim 12, further comprising forming a phonon-phonon interaction region on the resonator.

15. The method of claim 12, further comprising providing an interdigitated transducer at an oblique angle in relation to the resonator.

16. The method of claim 10, further comprising the acoustic pump simultaneously breaking orthogonality between optical modes of the resonator while also satisfying a phase matching condition.

17. The method of claim 10, further comprising providing a waveguide coupled with the resonator for guiding the light to the resonator.

18. The method of claim 17, further comprising providing grating couplers to allow light to be coupled into the waveguide.

19. The system of claim 6, wherein the acoustic pump breaks orthogonality at least between $TE_{10}$ and $TE_{00}$ optical modes while also satisfying a phase matching condition.

20. The system of claim 19, wherein when a resonance frequency of the $TE_{00}$ mode is higher than the $TE_{10}$ mode, the phase matching condition is satisfied in a forward direction, and when a resonance frequency of the $TE_{10}$ mode is higher than the $TE_{00}$ mode, the phase matching condition is satisfied in a backward direction.

21. The method of claim 16, wherein the acoustic pump breaks orthogonality between $TE_{10}$ and $TE_{00}$ optical modes while also satisfying a phase matching condition.

22. The method of claim 21, wherein when a resonance frequency of the $TE_{00}$ mode is higher than the $TE_{10}$ mode, the phase matching condition is satisfied in a forward direction, and when a resonance frequency of the $TE_{10}$ mode is higher than the $TE_{00}$ mode, the phase matching condition is satisfied in a backward direction.

\* \* \* \* \*